US010025644B2

(12) United States Patent
Iwaya et al.

(10) Patent No.: US 10,025,644 B2
(45) Date of Patent: *Jul. 17, 2018

(54) INFORMATION PROCESSING DEVICE AND INFORMATION PROCESSING SYSTEM

(71) Applicant: Sony Interactive Entertainment Inc., Tokyo (JP)

(72) Inventors: Akiko Iwaya, Ibaraki (JP); Masanao Nishikido, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/103,535

(22) PCT Filed: Jul. 16, 2014

(86) PCT No.: PCT/JP2014/003757
§ 371 (c)(1),
(2) Date: Jun. 10, 2016

(87) PCT Pub. No.: WO2015/097932
PCT Pub. Date: Jul. 2, 2015

(65) Prior Publication Data
US 2016/0314027 A1    Oct. 27, 2016

(30) Foreign Application Priority Data

Dec. 27, 2013    (JP) .................. 2013-273236

(51) Int. Cl.
*G06F 3/00*    (2006.01)
*G06F 9/54*    (2006.01)
*G06F 9/50*    (2006.01)

(52) U.S. Cl.
CPC ........... *G06F 9/542* (2013.01); *G06F 9/5072* (2013.01); *G06F 9/54* (2013.01)

(58) Field of Classification Search
CPC ..................... G06F 9/54; G05F 9/54
(Continued)

(56) References Cited

U.S. PATENT DOCUMENTS 5,325,492 A * 6/1994 Bonevento ........... G06F 5/06
701/121
5,682,507 A * 10/1997 Phillips .............. G06F 9/546
709/203
(Continued)

FOREIGN PATENT DOCUMENTS

CN    103200216 A    7/2013
CN    1714900 A    1/2016
(Continued)

OTHER PUBLICATIONS

Yongdong, Cache Consistency and Concurrency Control in a Client/Server DBMS Architecture, 1991.*
(Continued)

*Primary Examiner* — Lechi Truong
(74) *Attorney, Agent, or Firm* — Matthew B. Dernier, Esq.

(57) ABSTRACT

A client terminal and a server system having a plurality of processing units processing game applications are connected to each other via a network. In a game system was a cloud computing system, the server system makes the client terminal wait for a start of processing of an application when there is no processing unit assignable to the client terminal. The client terminal processes another application locally in a state of waiting for the start of the processing of the application in the server system.

7 Claims, 27 Drawing Sheets

(58) Field of Classification Search
USPC .......................................................... 719/310
See application file for complete search history.

(56) References Cited

U.S. PATENT DOCUMENTS

| | | | |
|---|---|---|---|
| 6,996,603 | B1 | 2/2006 | Srinivasan |
| 7,694,236 | B2 | 4/2010 | Gusmorino |
| 9,131,139 | B2 | 9/2015 | Tanabe |
| 2002/0049086 | A1 | 4/2002 | Otsu |
| 2003/0011805 | A1 | 1/2003 | Yacoub |
| 2003/0101213 | A1 | 5/2003 | Wright |
| 2004/0098426 | A1 | 8/2004 | Ishii |
| 2005/0034134 | A1 | 2/2005 | Lieblich |
| 2005/0267980 | A1* | 12/2005 | Warren .................... H04L 51/30 709/232 |
| 2006/0173998 | A1* | 8/2006 | Ohara ................. H04N 1/00222 709/224 |
| 2008/0276300 | A1* | 11/2008 | Terao .................... H04N 21/235 726/3 |
| 2009/0221367 | A1 | 9/2009 | Longley |
| 2009/0292640 | A1 | 11/2009 | Heatherly |
| 2009/0325690 | A1 | 12/2009 | Zhou |
| 2010/0029386 | A1* | 2/2010 | Pitsch ...................... A63F 13/12 463/35 |
| 2010/0255909 | A1 | 10/2010 | McNamara |
| 2011/0118033 | A1 | 5/2011 | Fiedler |
| 2011/0300832 | A1* | 12/2011 | Shaw .................. H04L 12/5895 455/412.1 |
| 2012/0021823 | A1 | 1/2012 | Youm |
| 2012/0178537 | A1 | 7/2012 | Ganz |
| 2012/0309525 | A1 | 12/2012 | Nogami |
| 2012/0311080 | A1 | 12/2012 | Alsina |
| 2013/0182133 | A1 | 7/2013 | Tanabe |
| 2013/0231194 | A1 | 9/2013 | Wang |
| 2013/0247004 | A1 | 9/2013 | Deluca |
| 2013/0272511 | A1 | 10/2013 | Bouzid |
| 2014/0095625 | A1 | 4/2014 | Quan |
| 2014/0181675 | A1 | 6/2014 | Suzuki |
| 2014/0187163 | A1* | 7/2014 | Fujita .................... H04W 4/008 455/41.2 |
| 2014/0380326 | A1* | 12/2014 | Kurihara ............... G06F 9/4881 718/102 |
| 2015/0011313 | A1 | 1/2015 | Ikenaga |
| 2015/0094150 | A1 | 4/2015 | Gregory |
| 2016/0310845 | A1* | 10/2016 | Iwaya ................... G06F 9/5072 |
| 2016/0321568 | A1 | 11/2016 | Gosuin |

FOREIGN PATENT DOCUMENTS

| | | |
|---|---|---|
| EP | 2560344 A2 | 2/2013 |
| JP | 2000148348 A | 5/2000 |
| JP | 2002197058 A | 7/2002 |
| JP | 2002279114 A | 9/2002 |
| JP | 2003088684 A | 3/2003 |
| JP | 2005046304 A | 2/2005 |
| JP | 2006006853 A | 1/2006 |
| JP | 2012174205 A | 9/2012 |
| JP | 2012142044 A2 | 10/2012 |
| JP | 2013081158 A | 5/2013 |
| JP | 2013145978 A | 7/2013 |
| WO | 2008015310 A1 | 2/2008 |
| WO | 2012142044 A2 | 10/2012 |
| WO | 2013128709 A1 | 9/2013 |

OTHER PUBLICATIONS

International Preliminary Report on Patentability and Written Opinion for corresponding PCT Application No. PCT/JP2014/003757, 11 pages, dated Jul. 7, 2016.
International Preliminary Report on Patentability and Written Opinion for corresponding PCT Application No. PCT/JP2014/003758, 11 pages, dated Jul. 7, 2016.
International Search Report for corresponding PCT Application No. PCT/JP2014/003757, 1 page, dated Sep. 30, 2014.
International Search Report for corresponding PCT Application No. PCT/JP2014/003756, 2 pages, dated Sep. 30, 2014.
International Preliminary Report on Patentability and Written Opinion for corresponding PCT Application No. PCT/JP2014/003756, 6 pages, dated Jun. 30, 2016.
International Search Report for related PCT Application No. PCT/JP2014/003625, 2 pages, dated Oct. 7, 2014.
International Preliminary Report on Patentability and Written Opinion for related PCT Application No. PCT/JP2014/003625, 11 pages, dated Jul. 7, 2016.
International Search Report for related PCT Application No. PCT/JP2014/003758, 1 page, dated Sep. 30, 2014.
Office Action for related JP Application No. 2013-273235, 7 pages, dated Jan. 10, 2017.
Office Action for related U.S. Appl. No. 15/103,518, 8 pages, dated Sep. 13, 2017.
Extended Search Report for related EP Application No. 14875035.9, 7 pages, dated Jul. 18, 2017.
European Search Report for related EP Application No. 14873719, 7 pages, dated Nov. 7, 2017.
Office Action for related U.S. Appl. No. 15/104,126, 19 pages, dated Apr. 20, 2018.
Office Action for related CN Application No. 2014800699688, 16 pages, dated Mar. 27, 2018.
Office Action for related U.S. Appl. No. 15/104,141, 12 pages, dated Jun. 6, 2018.

* cited by examiner

F I G . 2
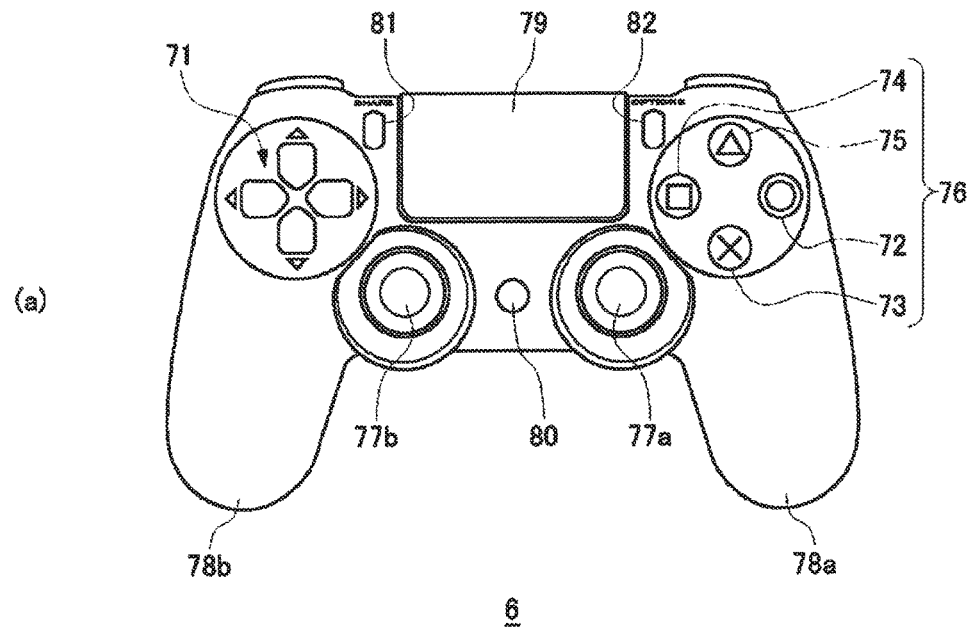
(a)
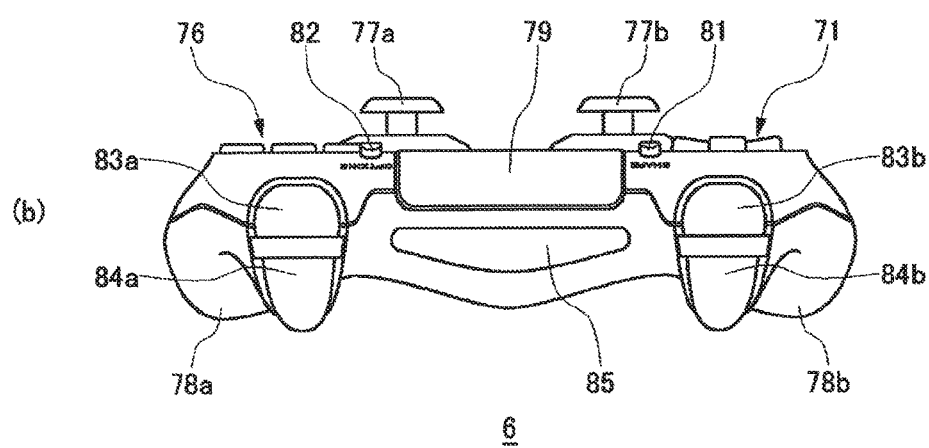
(b)

FIG. 26

SELECT SAVE DATA TO BE STORED

☒ RETURN ⊙ ENTER

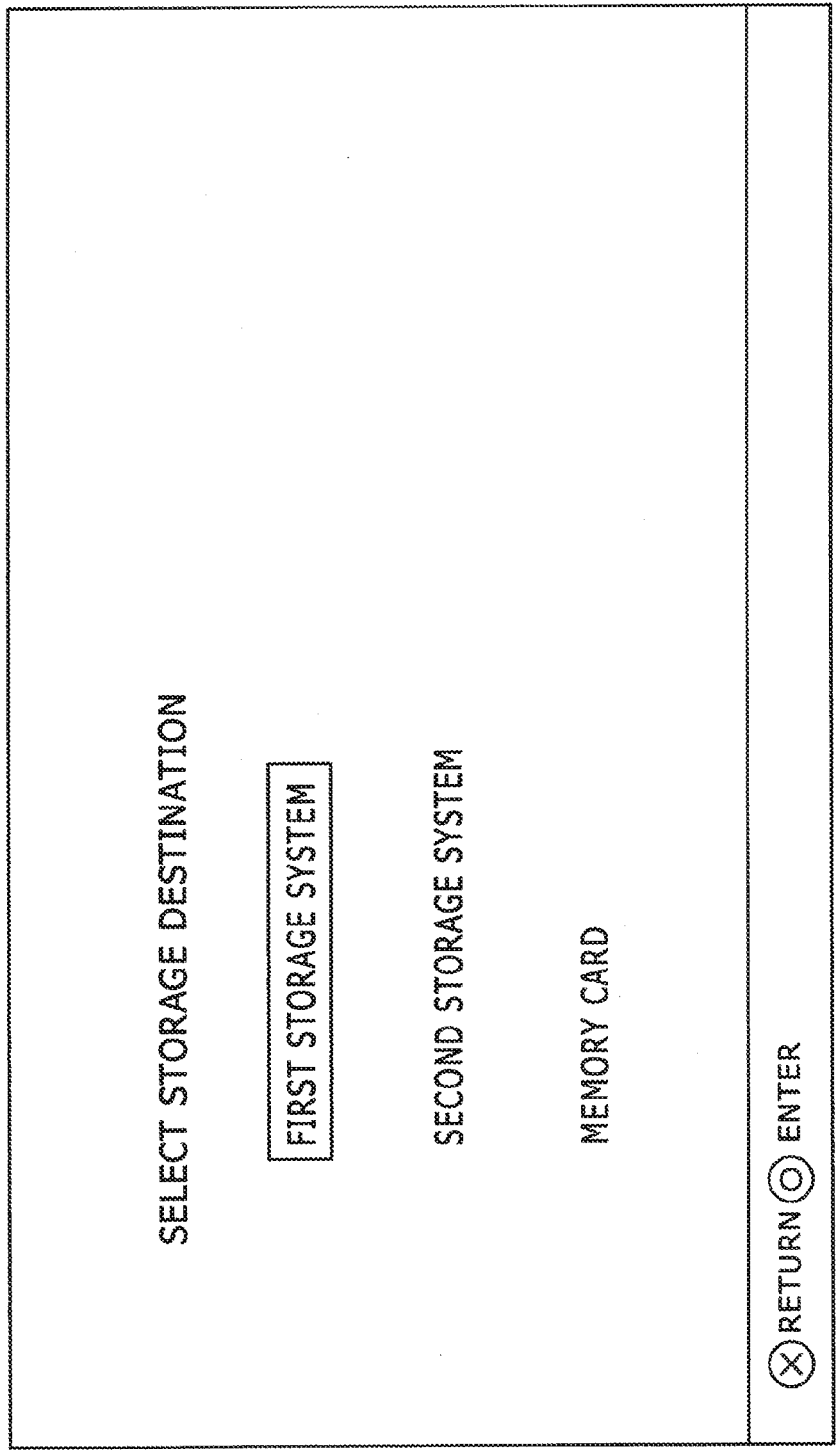

INFORMATION PROCESSING DEVICE AND INFORMATION PROCESSING SYSTEM

TECHNICAL FIELD

The present invention relates to an information processing technology for processing applications.

BACKGROUND ART

Recently, communication technologies for networks including the Internet have progressed rapidly, and so-called cloud service, in which users are provided with various applications via a network, has been realized. By using the cloud service, even when a user does not possess an application program, the user can use the application.

SUMMARY

Technical Problems

In a cloud game, operation information input to a client terminal is transmitted to a server system. The server system performs arithmetic processing of a game program using the operation information, and thereafter performs streaming distribution of a rendered game image and game sound to the client terminal. In such a cloud computing system, it is desirable to be able to provide a convenient cloud service to users.

In addition, when the cloud game is realized, one user can not only execute a game program having a certain title on the client terminal but also execute a game program having the same title on a cloud server. When such a usage scene is assumed, it is desirable to provide an environment in which a user can efficiently access the save data of a game.

It is accordingly an object of the present invention to realize the environment of a convenient information processing system.

Solution to Problems

In order to solve the above problems, according to a mode of the present invention, there is provided an information processing device including: a receiving section receiving a request to execute an application; an obtaining section obtaining information on a wait for processing of the application from a server system when there is no assignable processing unit in the server system; and a notifying section making a notification that the processing of the application is to be started when the obtaining section obtains information indicating that the processing of the application can be started from the server system in a state of waiting for a start of the processing of the application in the server system.

Another mode of the present invention relates to an information processing system including: a client terminal; and a server system having a plurality of processing units processing applications; the client terminal and the server system being connected to each other via a network. The server system includes a first obtaining section obtaining a request to execute an application, an assignment processing section making the client terminal wait for a start of processing of the application when there is no processing unit assignable to the client terminal, and a transmitting section transmitting information indicating that the processing of the application can be started to the client terminal when at least one processing unit becomes assignable. The client terminal includes a second obtaining section obtaining the information indicating that the processing of the application can be started from the server system, and a notifying section making a notification that the processing of the application is to be started in the server system.

It is to be noted that arbitrary combinations of the above constituent elements as well as modes obtained by converting expressions of the present invention between a method, a device, a system, a recording medium, a computer program, and the like are also effective as modes of the present invention.

BRIEF DESCRIPTION OF DRAWINGS

FIG. 2 (a) is a diagram illustrating an external constitution of a top surface of an input device, and (b) is a diagram illustrating an external constitution of a side surface on a back side of the input device.

FIG. 26 is a diagram illustrating a save data selecting screen.

FIG. 27 is a diagram illustrating an upload destination selecting screen.

DESCRIPTION OF EMBODIMENT

Figure 1:
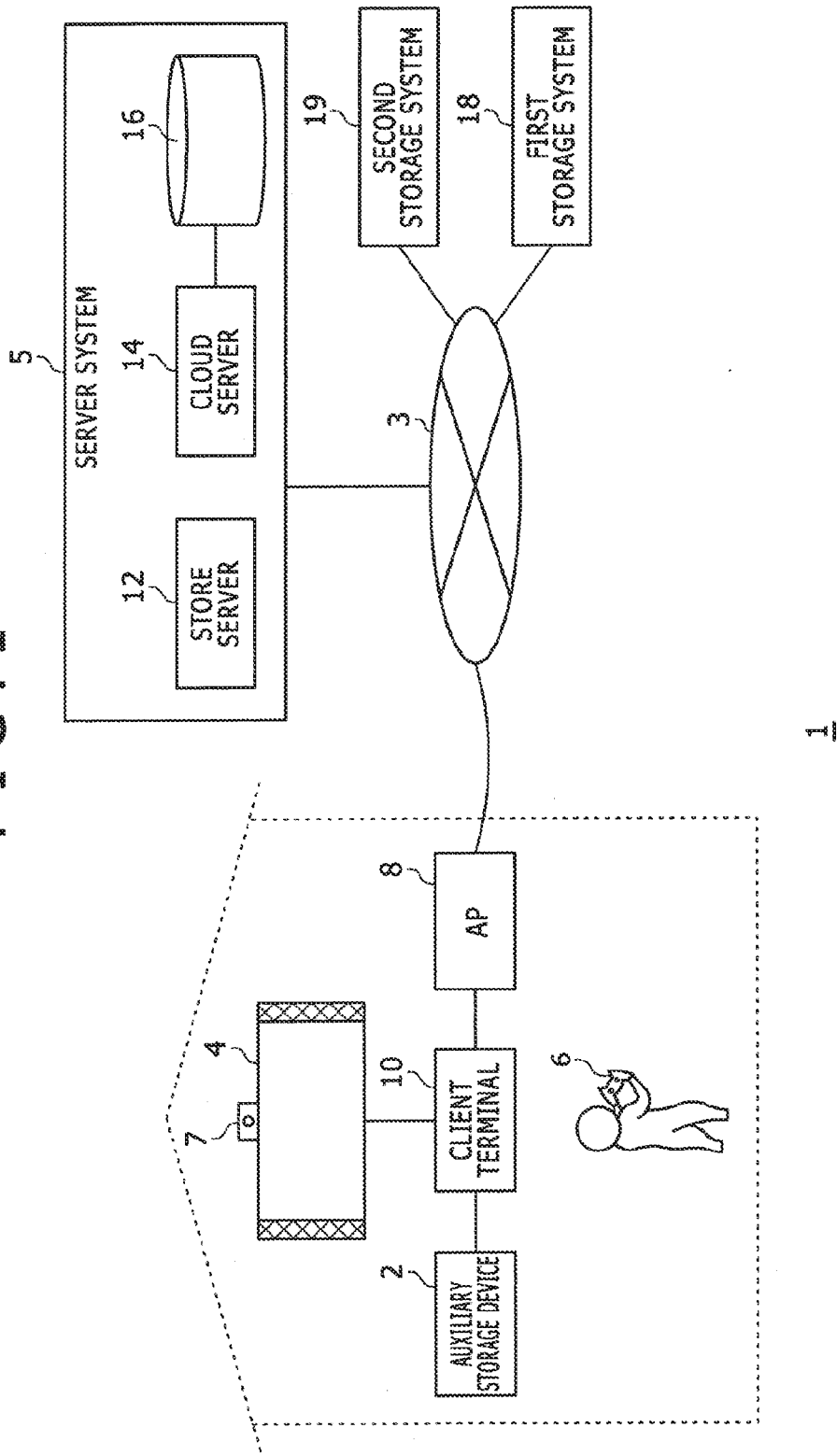
FIG. 1 is a diagram illustrating a game system according to an embodiment.

FIG. 1 illustrates a game system 1 according to an embodiment of the present invention. The game system 1 is illustrated as one mode of an information processing system that processes an application and which suitably manages save data. The information processing system in the present invention may be configured to have a function of processing not only a game but also other kinds of applications.

The game system 1 includes a client terminal 10 as a user terminal, a server system 5, a first storage system 18, and a second storage system 19. FIG. 1 illustrates an example in which the client terminal 10 is installed within a house. An access point (hereinafter referred to as an "AP") 8 within the house has functions of a wireless access point and a router. The client terminal 10 is connected to the AP 8 via radio or wire to be communicatably connected to the server system 5, the first storage system 18, and the second storage system 19 on a network 3. Incidentally, the second storage system 19 may be connected to the network 3 via the server system 5. While the server system 5 may be constituted of a plurality of servers as illustrated in the figure, the server system 5 may be constituted of a single server.

An auxiliary storage device 2 is a mass storage device such as an HDD (hard disk drive), a flash memory, or the like. The auxiliary storage device 2 may be an external storage device connected to the client terminal 10 by USB (Universal Serial Bus) or the like, or may be an internal storage device. The auxiliary storage device 2 is a local storage device of the client terminal 10. The auxiliary storage device 2 can store the save data of an application processed by the client terminal 10 and the like.

An output device 4 may be a television set including a display that outputs an image and a speaker that outputs sound, or may be a computer display. A camera 7 as an imaging device is provided in the vicinity of the output device 4 to image a space around the output device 4. The client terminal 10 is connected to an input device 6 operated by a user by radio or by wire. The input device 6 outputs operation information indicating a result of operation of the user to the client terminal 10.

The input device 6 may be a game controller having a plurality of input sections such as a plurality of push type operating buttons, an analog stick enabling an analog quantity to be input, a rotary button, and the like. However, the input device 6 may be an input interface device such as a keyboard, a mouse, a touch pad, or the like.

When the client terminal 10 receives operation information from the input device 6, the client terminal 10 reflects the operation information in the processing of an OS (system software) or an application, and outputs a result of the processing from the output device 4. In this sense, the client terminal 10 functions as an information processing device capable of processing an application singly. For example, the client terminal 10 may be a stationary game device.

Incidentally, the game system 1 in the present embodiment is a client server system, and is, in particular, configured as a cloud computing system (cloud gaming system). An application such as a game or the like is processed in the server system 5 in response to a request from the user. The client terminal 10 transmits operation information from the input device 6 to the server system 5. In addition, the client terminal 10 receives a result of processing of the application from the server system 5, and outputs the processing result from the output device 4.

The server system 5 includes: a store server 12 that gives the user a license as a right to execute an application; and a cloud server 14 that processes the application and which performs streaming distribution of an application image and/or application sound as a result of the processing to the client terminal 10. A database 16 retains the disk images of a plurality of applications. The cloud server 14 reads a disk image from the database 16 and executes the disk image in response to a request from the client terminal 10. The cloud server 14 has a plurality of processing units having a function of performing arithmetic processing of an application, assigns one processing unit to one user, and thus provides the application to the user. For example, when the cloud server 14 has 10000 processing units, 10000 users can access the cloud server 14, and be provided with the application.

Such a game system 1 provides game processing service to a plurality of users on demand via the network 3. The user of the client terminal 10 provided with the service from the cloud server 14 operates a game image displayed on the output device 4 using the input device 6. When the user requests save data to be stored, the cloud server 14 stores the save data of the cloud game in the second storage system 19.

As described above, the client terminal 10 has calculation resources such as a CPU (Central Processing Unit) or the like, and inherently has a function of executing an application in a local environment of the client terminal 10. Therefore, in a case where the user plays a certain game on the cloud server 14 (a mode in which the user plays a game processed by the cloud server 14 may hereinafter be referred to as "cloud play"), the user may install the same game onto the client terminal 10, and play the game in the local environment (a mode in which the user plays a game processed by the client terminal 10 may hereinafter be referred to as "local play"). At this time, the user can desirably play the game using save data stored in the second storage system 19.

Accordingly, the game system 1 according to the present embodiment provides the user with an environment in which save data is managed efficiently. The game system 1 includes, as a save data storage function, the auxiliary storage device 2 as a local storage device and the first storage system 18 and the second storage system 19. Incidentally, it suffices to provide at least the auxiliary storage device 2 and the second storage system 19 as a save data storage function in the game system 1. However, a storage function further enhancing the convenience of the user can be realized by providing the first storage system 18. In this case, the first storage system 18 is configured as a backup storage for the auxiliary storage device 2. The user can upload the save data of a game which save data is stored in the auxiliary storage device 2 to the first storage system 18. Consequently, even when a malfunction of the auxiliary storage device 2 causes a trouble in accessing the save data, the user can suitably use the save data backed up to the first storage system 18.

On the other hand, the second storage system 19 is connected to the server system 5 via the network 3 or another local network to store save data generated in the server system 5. The second storage system 19 may be configured to synchronize the stored save data with the save data of the auxiliary storage device 2 on the client terminal 10 side. Thus, whether the user executes a game application of a same title on the client terminal 10 or on the server system 5, the user can use the latest save data. Incidentally, the save data stored in the second storage system 19 may be uploaded to the first storage system 18 via the client terminal 10 so that the first storage system 18 performs backup storage of the save data. The game system 1 can thus realize suitable management of save data by making efficient use of the first storage system 18 and the second storage system 19.

Description will next be made of a button configuration of the input device 6.

[Constitution of Upper Surface Portion] FIG. 2(*a*) illustrates an external constitution of an upper surface of the input device. The user operates the input device 6 while holding a left grip portion 78*b* with a left hand and holding a right grip portion 78*a* with a right hand. The upper surface of a casing of the input device 6 is provided with a direction key 71, analog sticks 77*a* and 77*b*, and four kinds of operating buttons 76 as input sections. The four kinds of buttons 72 to 75 are marked with different figures of different colors so as to be distinguished from one another. Specifically, the circle button 72 is marked with a red circle, the cross button 73 is marked with a blue cross, the square button 74 is marked with a purple square, and the triangle button 75 is marked with a green triangle. A touch pad 79 is provided in a flat region between the direction key 71 and the operating buttons 76 on the upper surface of the casing. The touch pad 79 also functions as a depression type button that sinks downward when pressed by the user and which returns to an original position when released by the user.

A home button 80 is provided between the two analog sticks 77*a* and 77*b*. The home button 80 is used to turn on power to the input device 6 and simultaneously activate a communication function that connects the input device 6 and the client terminal 10 to each other. Incidentally, when the home button 80 is depressed in a case where the main power supply of the client terminal 10 is off, the client terminal 10 receives a connection request transmitted from the input device 6 also as an instruction to turn on the main power supply. The main power supply of the client terminal 10 is thereby turned on. After the input device 6 is connected to the client terminal 10, the home button 80 is also used to display a home screen on the client terminal 10.

A SHARE button 81 is provided between the touch pad 79 and the direction key 71. The SHARE button 81 is used to input an instruction from the user to the OS or system software in the client terminal 10. In addition, an OPTIONS button 82 is provided between the touch pad 79 and the operating buttons 76. The OPTIONS button 82 is used to input an instruction from the user to an application (game) executed in the client terminal 10. The SHARE button 81 and the OPTIONS button 82 may each be formed as a push type button.

[Constitution of Side Surface Portion on Back Side] FIG. 2(*b*) illustrates an external constitution of a side surface on the back side of the input device. On the upper side of the side surface on the back side of the casing of the input device 6, the touch pad 79 is extended from the upper surface of the casing. A horizontally long light emitting portion 85 is provided on the lower side of the side surface on the back side of the casing. The light emitting portion 85 has a red (R) LED, a green (G) LED, and a blue (B) LED. The light emitting portion 85 illuminates according to light emission color information transmitted from the client terminal 10. On the side surface on the back side of the casing, an upper side button 83*a*, a lower side button 84*a*, an upper side button 83*b*, and a lower side button 84*b* are disposed at left and right positions symmetric in a longitudinal direction.

The upper side button 83*a* and the lower side button 84*a* are operated by the index finger and the middle finger, respectively, of the right hand of the user. The upper side button 83*b* and the lower side button 84*b* are operated by the index finger and the middle finger, respectively, of the left hand of the user. As illustrated in the figure, the light emitting portion 85 is disposed between the line of the upper side button 83*a* and the lower side button 84*a* on the right side and the line of the upper side button 83*b* and the lower side button 84*b* on the left side. Therefore the light emitting portion 85 is not hidden by the index fingers or the middle fingers operating the respective buttons. The camera 7 can thus image the illuminating light emitting portion 85 ideally. The upper side button 83 may be configured as a push type button. The lower side button 84 may be configured as a rotatably supported trigger type button.

Figure 3:
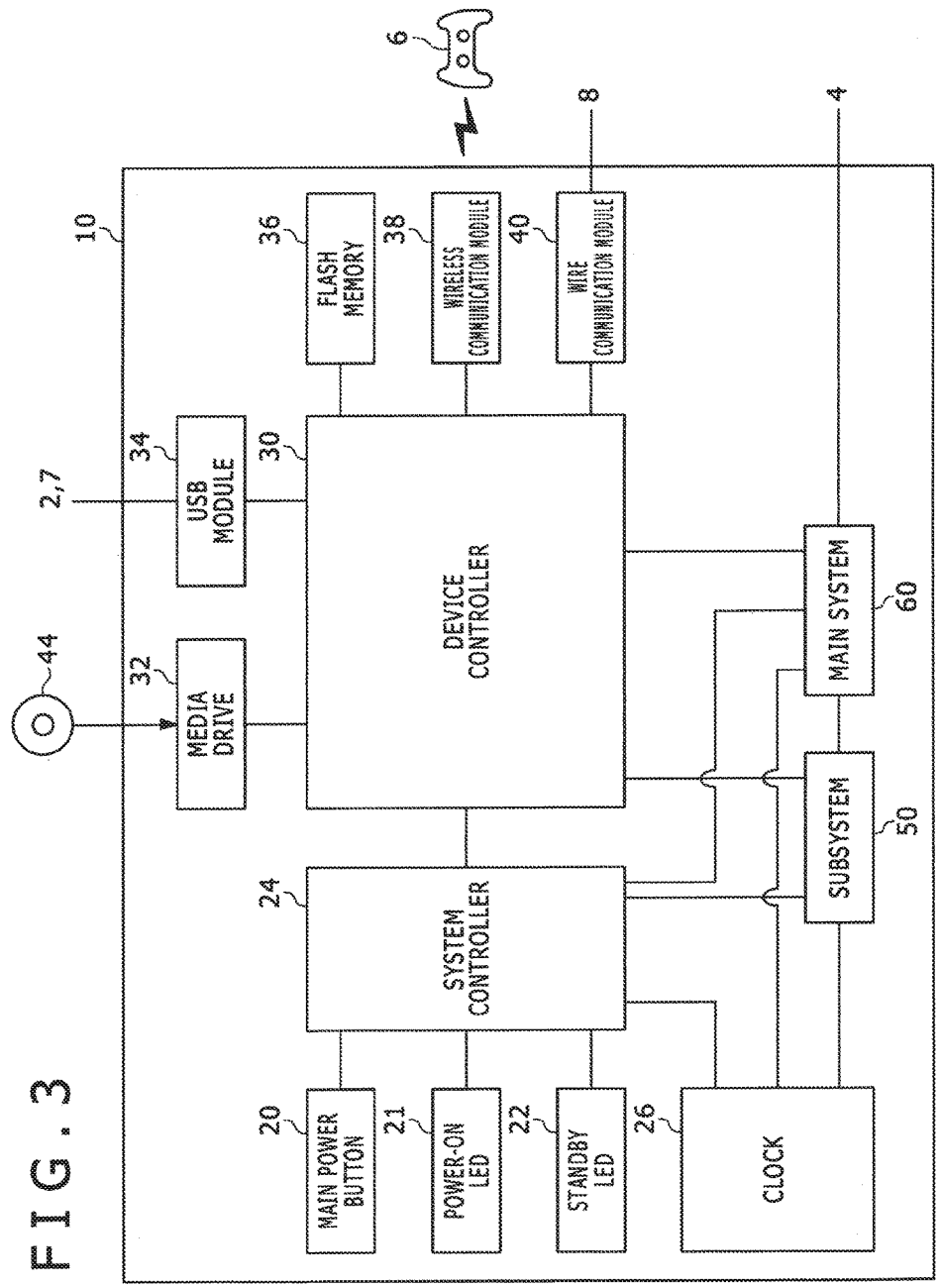
FIG. 3 is a diagram illustrating a functional block diagram of a client terminal.

FIG. 3 illustrates a functional block diagram of the client terminal 10. The client terminal 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory as a main storage device and a memory controller, a GPU (Graphics Processing Unit), and the like. The GPU is used mainly for arithmetic processing of a game program. These functions may be configured as a system on chip, and formed on one chip. The main CPU has a function of starting the OS and executing an application installed in the auxiliary storage device 2 under an environment provided by the OS. In addition, in the game system 1 configured as a cloud computing system, the main CPU has another function of outputting, from the output device 4, an application image and application sound provided from the server system 5.

The subsystem 50 includes a sub-CPU, a memory as a main storage device and a memory controller, and the like. The subsystem 50 does not include a GPU. The number of circuit gates of the sub-CPU is smaller than the number of circuit gates of the main CPU. The power consumption in operation of the sub-CPU is lower than the power consumption in operation of the main CPU. As described above, the sub-CPU operates while the main CPU is in a standby state. The processing functions of the sub-CPU are limited to reduce the power consumption of the sub-CPU. Incidentally, the sub-CPU and the memory may be formed on separate chips.

The main power button 20 is an input section to which an operating input from the user is performed. The main power button 20 is provided to a front surface of a casing of the client terminal 10. The main power button 20 is operated to turn on or off the supply of power to the main system 60 of the client terminal 10. An on state of the main power supply will hereinafter mean that the main system 60 is in an active state. An off state of the main power supply will hereinafter mean that the main system 60 is in a standby state. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The main CPU has a function of executing a game program installed in the auxiliary storage device 2 or on a ROM medium 44, whereas the sub-CPU does not have such a function. However, the sub-CPU has a function of accessing the auxiliary storage device 2. The sub-CPU is configured to have only such limited processing functions, and is therefore able to operate with lower power consumption than the main CPU. These functions of the sub-CPU are performed when the main CPU is in a standby state. Because the subsystem 50 is operating during the standby period of the main system 60, the client terminal 10 according to the present embodiment always maintains a state of signing in to the network service.

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As illustrated in the figure, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with a ROM medium 44 on which software such as a game application or the like and license information are recorded, drives the ROM medium 44, and reads a program, data, and the like from the ROM medium 44. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol, an IEEE 802.11 protocol, or the like. Incidentally, the wireless communication module 38 may support a third-generation (3rd Generation) digital mobile telephone system compliant with an IMT-2000 (International Mobile Telecommunication 2000) standard defined by the ITU (International Telecommunication Union), or may further support a digital mobile telephone system of another generation. The wire communication module 40 performs wire communication with an external device. The wire communication module 40 is connected to the network 3 via the AP 8, for example.

A configuration of the client terminal 10 will first be described.

Figure 4:
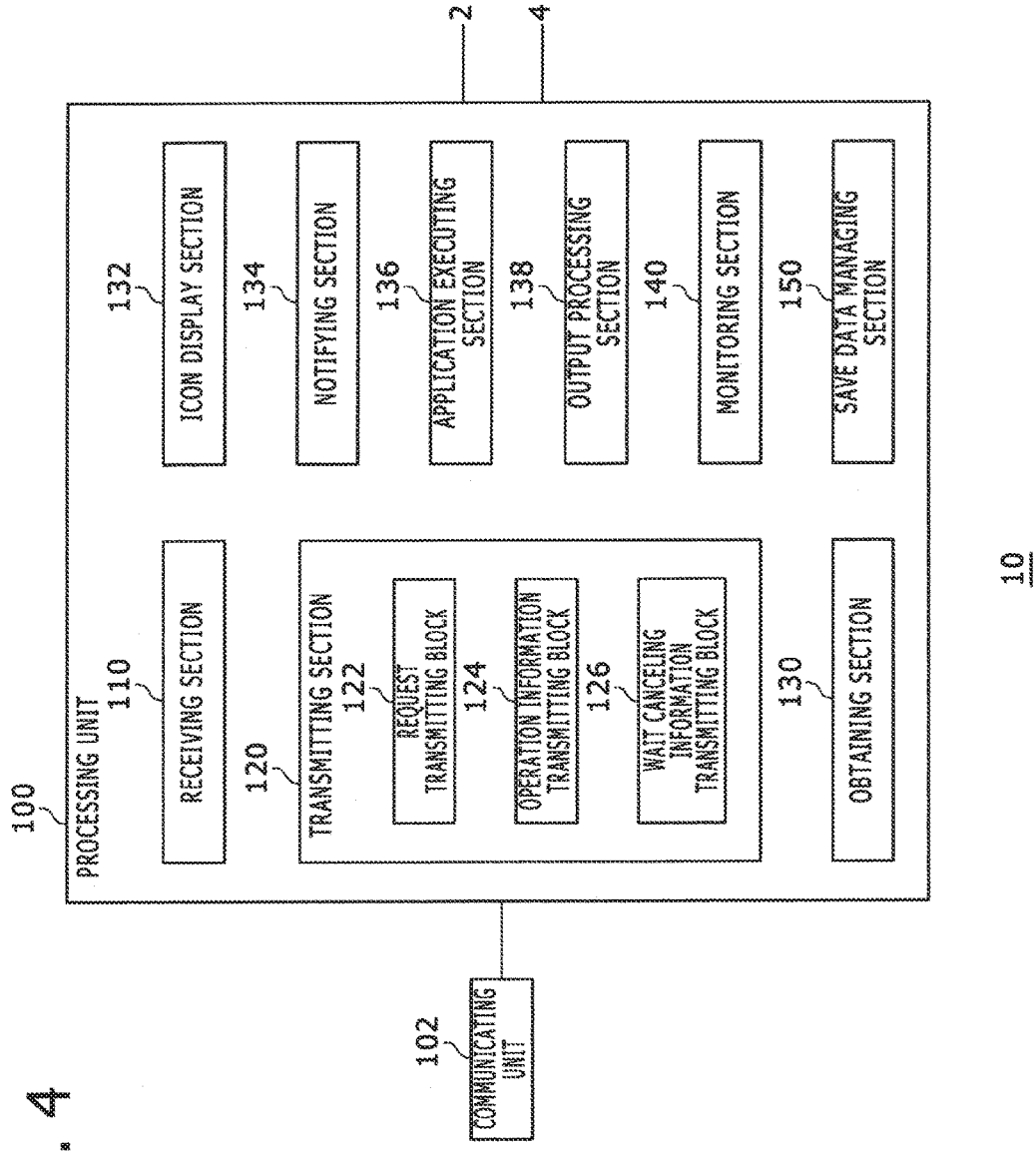
FIG. 4 is a diagram illustrating a configuration of the client terminal.

FIG. 4 illustrates a configuration of the client terminal 10. The client terminal 10 includes a processing unit 100 and a communicating unit 102. The processing unit 100 includes a receiving section 110, a transmitting section 120, an obtaining section 130, an icon display section 132, a notifying section 134, an application executing section 136, an output processing section 138, a monitoring section 140, and a save data managing section 150. The transmitting section 120 includes a request transmitting block 122, an operation information transmitting block 124, and a wait canceling information transmitting block 126. The communicating unit 102 is represented as a configuration combining the functions of the wireless communication module 38 and the wire communication module 40 illustrated in FIG. 3.

The elements described as functional blocks performing various processing in FIG. 4 can be configured by a circuit block, a memory, or another LSI in terms of hardware, and are implemented by a program loaded in a memory or the like in terms of software. Hence, it is to be understood by those skilled in the art that these functional blocks can be implemented in various forms by only hardware, only software, or combinations of hardware and software, and are not limited to any one of the forms.

The receiving section 110 receives operation information of the input device 6 via the communicating unit 102. When a cloud game is to be started, the receiving section 110 receives a request to execute an application in the server system 5. The transmitting section 120 transmits the application execution request, the operation information of the input device 6, and the like to the server system 5 via the communicating unit 102. The obtaining section 130 obtains a result of processing of the application, various kinds of information, and various kinds of data from the server system 5 via the communicating unit 102. The icon display section 132 displays the icon images of applications side by side on a home screen. The notifying section 134 displays a notification related to a game, particularly a notification related to a cloud game which notification is transmitted from the server system 5. Incidentally, the notifying section 134 may perform audio output of a notification related to a game. The application executing section 136 has a function of executing an application program retained in the auxiliary storage device 2 or an application program recorded on the ROM medium 44. The application executing section 136 in this case is represented as including functions realized by the application program. The output processing section 138 outputs an application image and application sound to the output device 4. The monitoring section 140 monitors the operating conditions of the client terminal 10, or specifically monitors the presence or absence of an input in the input device 6. The monitoring section 140 has a function of measuring a period during which there is no input from the input device 6 (non-operation period). The save data managing section 150 has a save data managing function that uploads or downloads save data to or from the first storage system 18 and/or the second storage system 19.

A configuration of the cloud server 14 will next be described.

Figure 5:
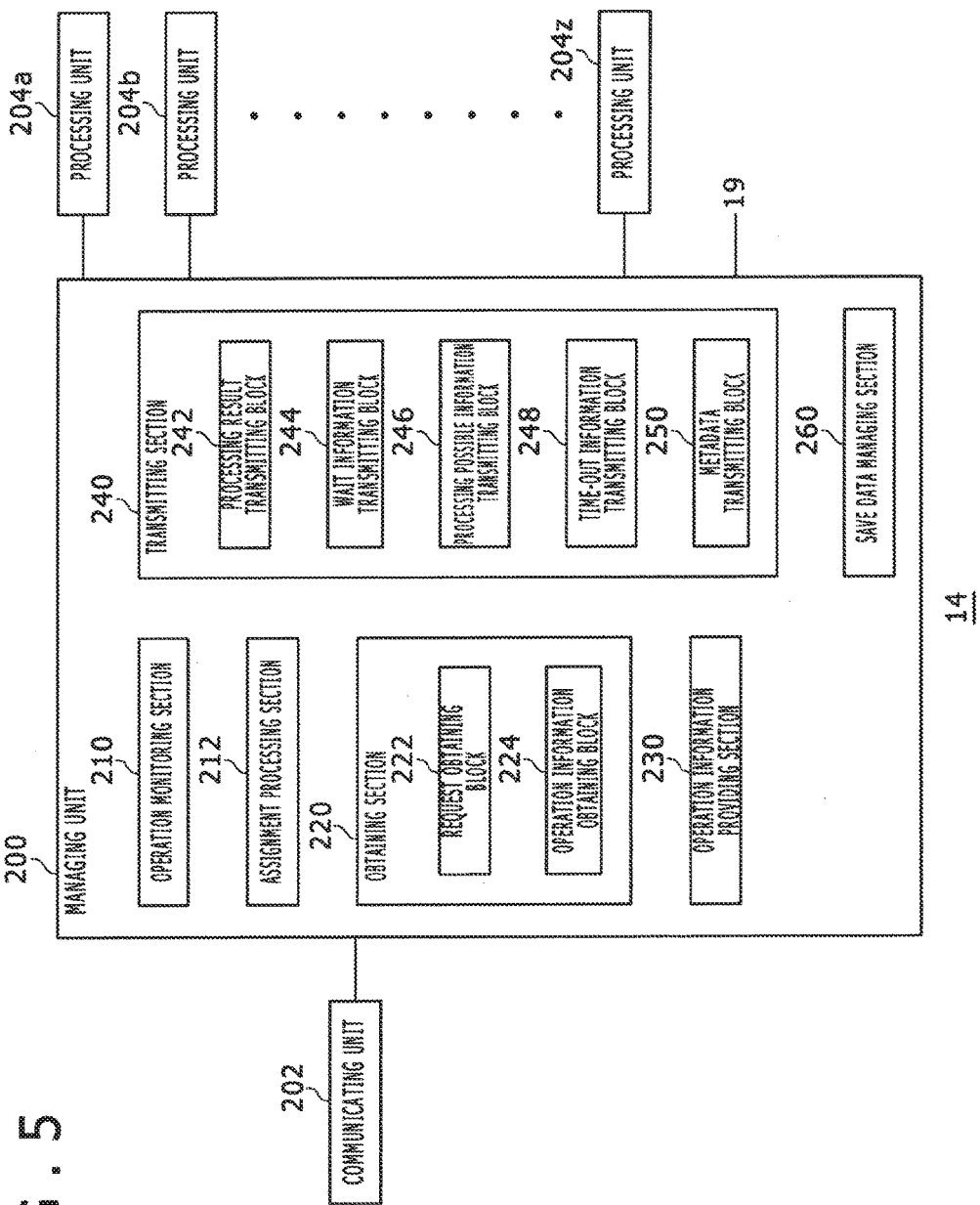
FIG. 5 is a diagram illustrating a configuration of a cloud server.

FIG. 5 illustrates a configuration of the cloud server 14. Incidentally, in the present embodiment, description will be made supposing that the server system 5 includes the store server 12 and the cloud server 14. However, the store server 12 and the cloud server 14 may be configured as a single server into which respective functions are integrated. Hence, the store server 12 may include part or the whole of the configuration of the cloud server 14 illustrated in FIG. 5, and the cloud server 14 may include part or the whole of the configuration of the store server 12 not illustrated in the figure. Hereinafter, for the convenience of description, suppose that the store server 12 has the role of an entrance for the user to play a cloud game, and that the cloud server 14 has the role of providing the cloud game to the user. However, it suffices for the configuration of the cloud server 14, which configuration will be described in the following, to be provided at least to the server system 5. The following description is not intended to clearly distinguish the functions of the store server 12 from the functions of the cloud server 14.

The cloud server 14 includes a managing unit 200, a communicating unit 202, and a plurality of processing units 204a, 204b, . . . , and 204z (which may hereinafter be referred to collectively as "processing units 204"). The plurality of processing units 204 have a function of reading the disk image of an application stored in the database 16, and executing the application program. The cloud server 14 for example has 10000 processing units 204, and has a function of assigning the processing units 204 to the client terminals 10 of 10000 users. The processing units 204 process a game application, and generate a game image and game sound as a result of the processing. The communicating unit 202 transmits and receives data to and from the communicating unit 102 of the client terminal 10 via the network 3.

The managing unit 200 includes an operation monitoring section 210, an assignment processing section 212, an obtaining section 220, an operation information providing section 230, a transmitting section 240, and a save data managing section 260. The obtaining section 220 includes a request obtaining block 222 and an operation information obtaining block 224. The transmitting section 240 includes a processing result transmitting block 242, a wait information transmitting block 244, a processing possible information transmitting block 246, a time-out information transmitting block 248, and a metadata transmitting block 250.

The elements described as functional blocks performing various processing in FIG. 5 can be configured by a circuit block, a memory, or another LSI in terms of hardware, and are implemented by a program loaded in a memory or the like in terms of software. Hence, it is to be understood by those skilled in the art that these functional blocks can be implemented in various forms by only hardware, only software, or combinations of hardware and software, and are not limited to any one of the forms. Incidentally, as already described, it suffices for the configuration illustrated in FIG. 5 to be provided in the server system 5. The store server 12 may therefore have the configuration illustrated in FIG. 5.

The operation monitoring section 210 monitors the operating conditions of the plurality of processing units 204 and the operating conditions of client terminals 10 to which processing units 204 are assigned. By monitoring the operating conditions of the plurality of processing units 204, the operation monitoring section 210 grasps whether or not there is a processing unit 204 that can be assigned to a user who desires to be provided with a cloud service, that is, a processing unit 204 usable by the user. The operation monitoring section 210 also monitors whether or not operation information is transmitted from the client terminal 10 of the user provided with the cloud service. This is because the number of processing units 204 is limited and it is desirable to free a processing unit 204 assigned to a client terminal 10 to which no operation information has been input for a predetermined time and to assign the processing unit 204 to another waiting user. The operation monitoring section 210 thus monitors the presence or absence of an unassigned processing unit 204 and the non-operation periods of the client terminals 10, and thereby effectively assists in the operation of the assignment processing section 212 that assigns processing units 204 to users. Incidentally, the operating conditions of a client terminal 10 may be monitored by the monitoring section 140 on the client terminal 10 side.

The assignment processing section 212 assigns a processing unit 204 to a client terminal 10. For example, the assignment processing section 212 may associate the identifying information (ID) of the processing unit 204 with the identifying information of the client terminal 10 (or the user) to which the processing unit 204 is assigned, and manages the identifying information in a table format. In addition, when there is no processing unit 204 that can be assigned to the user, the assignment processing section 212 makes the client terminal 10 wait for a start of processing of an application, and manages the user as a waiting user. When an assignable processing unit 204 appears, the assignment processing section 212 receives a notification to that effect from the operation monitoring section 210. According to this notification, the assignment processing section 212 assigns the assignable processing unit 204 to the client terminal 10 of the waiting user.

The obtaining section 220 obtains a request to execute an application or operation information of the input device 6 from the client terminal 10 via the communicating unit 202. When the request obtaining block 222 obtains a request to execute an application from the user, and there is an assignable processing unit 204 on the basis of the monitoring of the operation monitoring section 210, the assignment processing section 212 assigns the processing unit 204 so that the user uses the processing unit 204, and makes the processing unit 204 execute the requested application. When there is no assignable processing unit 204 on the basis of the monitoring of the operation monitoring section 210, on the other hand, the assignment processing section 212 puts the user as a waiting user in a queue, and thus manages the user as a waiting user. The operation information obtaining block 224 obtains operation information from the user to whom the processing unit 204 is assigned. The operation information providing section 230 provides the processing unit 204 with the operation information of the input device 6 which operation information is transmitted from the client terminal 10. The processing unit 204 thus generates a processing result such that the operation information is reflected in the progress of the application.

The transmitting section 240 transmits a game image and game sound generated by the processing unit 204, various kinds of information, and various kinds of data to the client terminal 10. The save data managing section 260 has a function of managing save data between the client terminal 10 and the cloud server 14.

A UI (user interface) displayed on the client terminal 10 will be described in the following on the basis of a display screen. When a user "TARO" logs in to the client terminal 10, a home screen is displayed.

Figure 6:
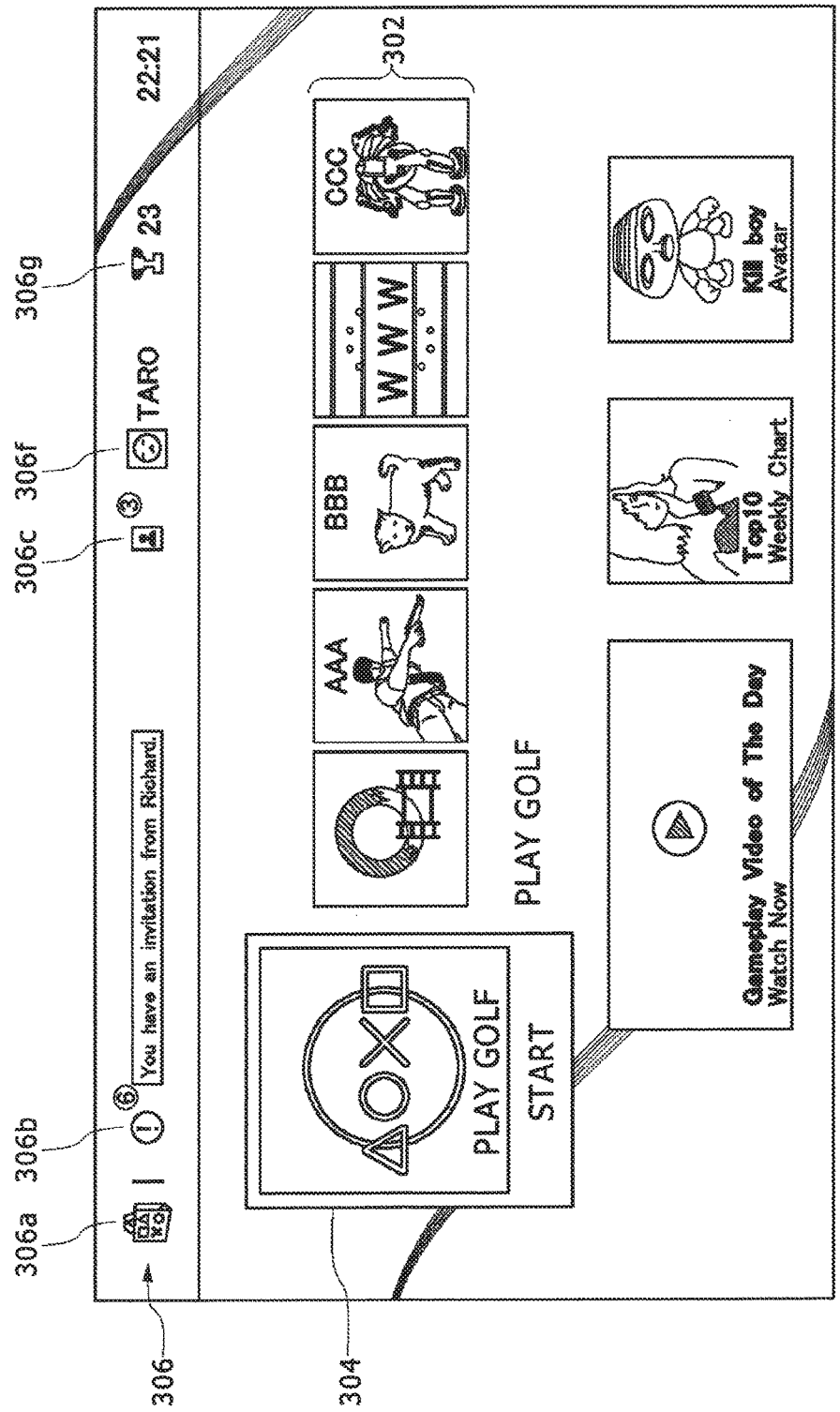
FIG. 6 is a diagram illustrating an example of a home screen.

FIG. 6 illustrates an example of a home screen generated by system software of the client terminal 10.

On the home screen, the icon display section 132 displays the icon images of a plurality of applications side by side in an icon row 302. On the home screen illustrated in FIG. 6, the icon images of applications processable by the application executing section 136 are displayed side by side. A focus frame 304 is provided at the head (that is, the left end) of the icon row 302. An icon image disposed in the focus frame 304 is displayed so as to be larger than the other icon images. In this case, the icon image of a game "play golf" is disposed in the focus frame 304. When the user places the icon image of the application desired to be executed in the focus frame 304, and operates the determining button (for example the circle button 72) of the input device 6, the program of the game "play golf" associated with the icon image is read from the auxiliary storage device 2 or the ROM medium 44 to be started.

In addition, the home screen displays a plurality of function icons 306 representing system functions provided by the client terminal 10. In the example of FIG. 6, the icon display section 132 displays a store icon 306a, a notification icon 306b, a friend icon 306c, a profile icon 306f, and a trophy icon 306g. When the user selects the store icon 306a and performs a determining operation on the home screen illustrated in FIG. 6, the system software displays a function screen related to the store icon 306a on the output device 4.

Figure 7:
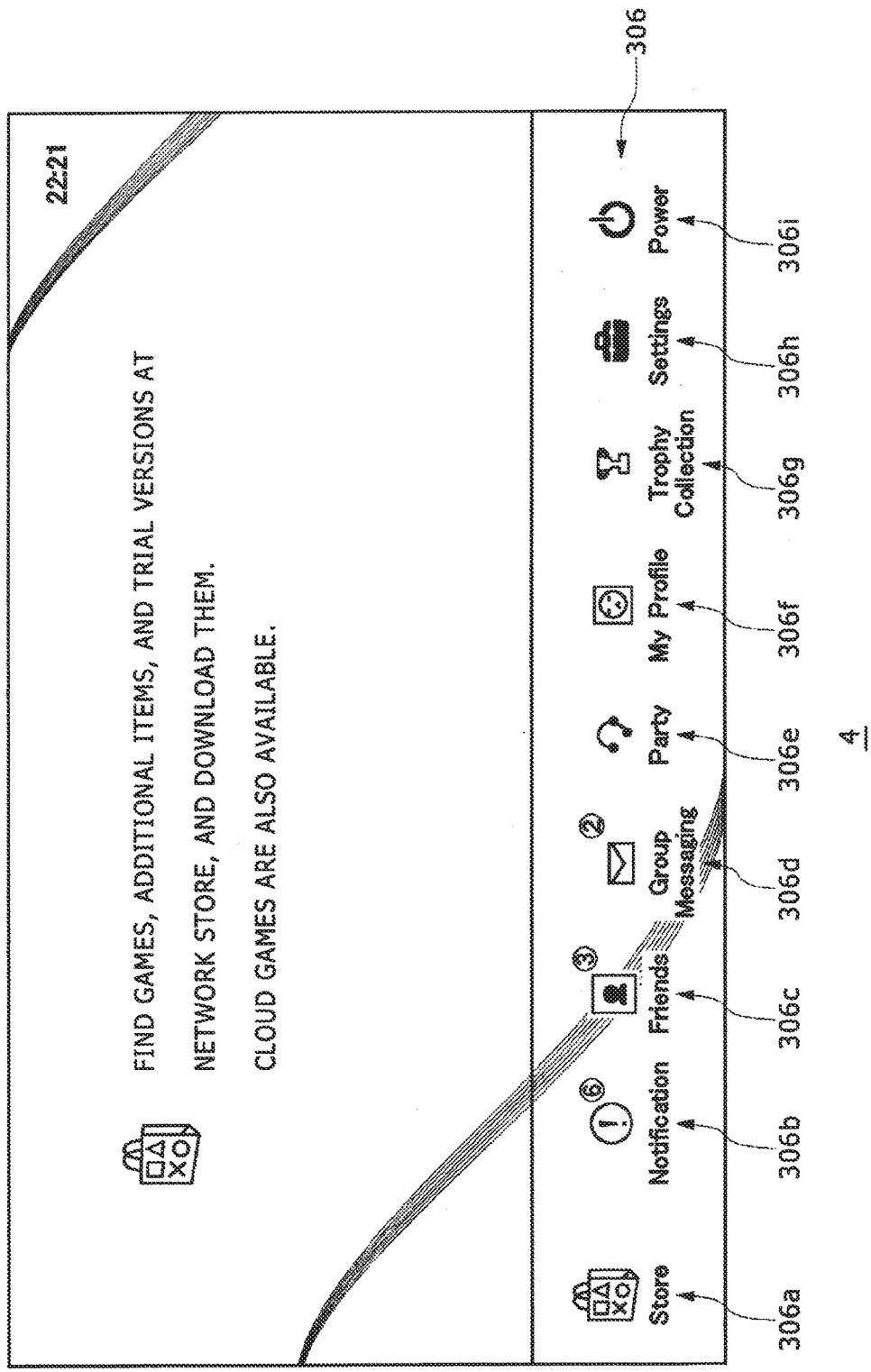
FIG. 7 is a diagram illustrating an example of a function screen.

FIG. 7 illustrates an example of the function screen to which a transition is made from the home screen.

On the function screen, the icon display section 132 arranges a plurality of function icons 306 side by side. The following are displayed in this case: the store icon 306a, the notification icon 306b, the friend icon 306c, a group message icon 306d, a party icon 306e, the profile icon 306f, the trophy icon 306g, a setting icon 306h, and a power icon 306i. The system software sequentially changes a function icon 306 on which focus is placed in response to an operating input of a horizontal direction (a left key or a right key of the direction key 71) on the input device 6 by the user, and displays the focus icon in a highlighted mode (in a large size, a different color, or the like). FIG. 7 illustrates a state in which the store icon 306a is selected, with focus placed thereon, and is displayed in a more highlighted manner than the other icons.

When the user performs a determining operation of the store icon 306a on which focus is placed on the function screen, the client terminal 10 accesses the store server 12, and a store screen is displayed on the output device 4. On this store screen, the user can select various contents such as a game to be downloaded and processed by the client terminal 10 (download game), a game processed in the cloud server 14 (cloud game), and the like. When the user selects a cloud game on the store screen, a rental screen of the game is displayed on the output device 4.

Figure 8:
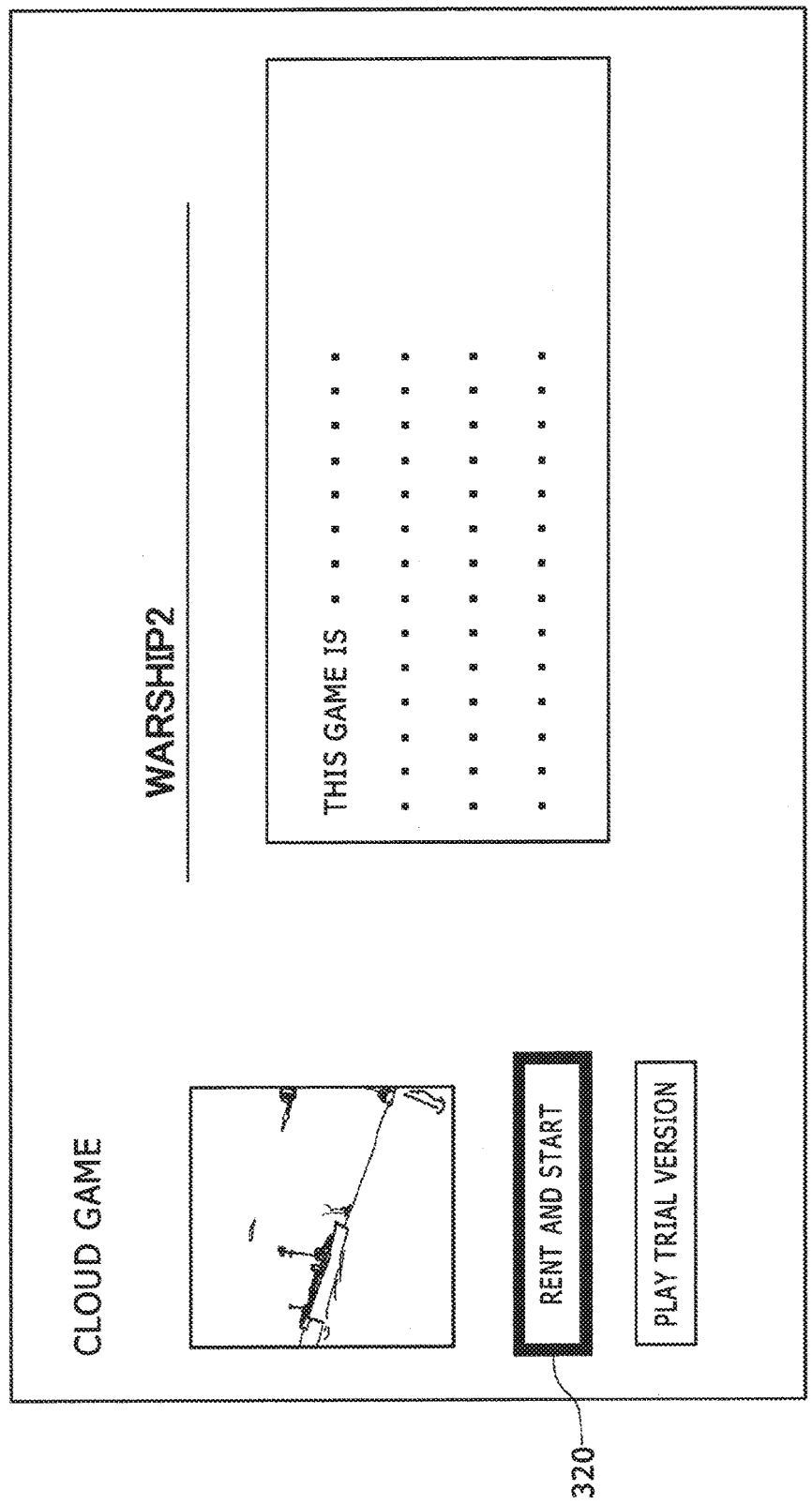
FIG. 8 is a diagram illustrating an example of a rental screen.

FIG. 8 illustrates an example of a rental screen. This rental screen is a screen serving as an entrance for the user to rent a cloud game "WARSHIP2" for a predetermined period and access the cloud server 14. The game system 1 according to the present embodiment has a mechanism constructed such that by thus renting the cloud game for a predetermined period (for example one month) at the store server 12, the user can obtain a license for one month and thus play the cloud game during the period. Incidentally, this is an example of a form of providing the cloud game. The user may obtain a permanent license by purchasing the cloud game in a form of outright purchase at the store server 12.

When the user sets a focus frame 320 to a "RENT AND START" button on the rental screen, and operates the determining button of the input device 6, the store server 12 gives a license to play "WARSHIP2" to the user, and transmits the metadata of the application such as the title name, the icon image, the parental control information, and the like of "WARSHIP2" to the client terminal 10. Incidentally, as will be described later, the metadata may be transmitted from the cloud server 14 to the client terminal 10, and the store server 12 may transmit only part of the title name, the icon image, and the parental control information to the client terminal 10.

When the user depresses the "RENT AND START" button on the rental screen, the store server 12 notifies the cloud server 14 that the user has the license for "WARSHIP2," and transmits a request to execute "WARSHIP2" to the cloud server 14. When the request obtaining block 222 obtains the execution request in the cloud server 14, the metadata transmitting block 250 transmits the metadata of the application such as the title name, the icon image, the parental control information, and the like of "WARSHIP2" to the client terminal 10. These pieces of metadata are transmitted to be displayed on the home screen of the client terminal 10, and are obtained by the obtaining section 130 in the client terminal 10. Thereafter, the cloud server 14 checks whether the user has a proper license, and checks a communication environment between the client terminal 10 and the cloud server 14. Incidentally, the store server 12 may proceed to make these checks.

Incidentally, when the user depresses the "RENT AND START" button, a dedicated application for playing the cloud game (which application may also hereinafter be referred to as a "player app") may be started automatically in the client terminal 10. The player app may for example implement a function of the monitoring section 140, and measure the non-operation period of the client terminal 10.

Figure 9:
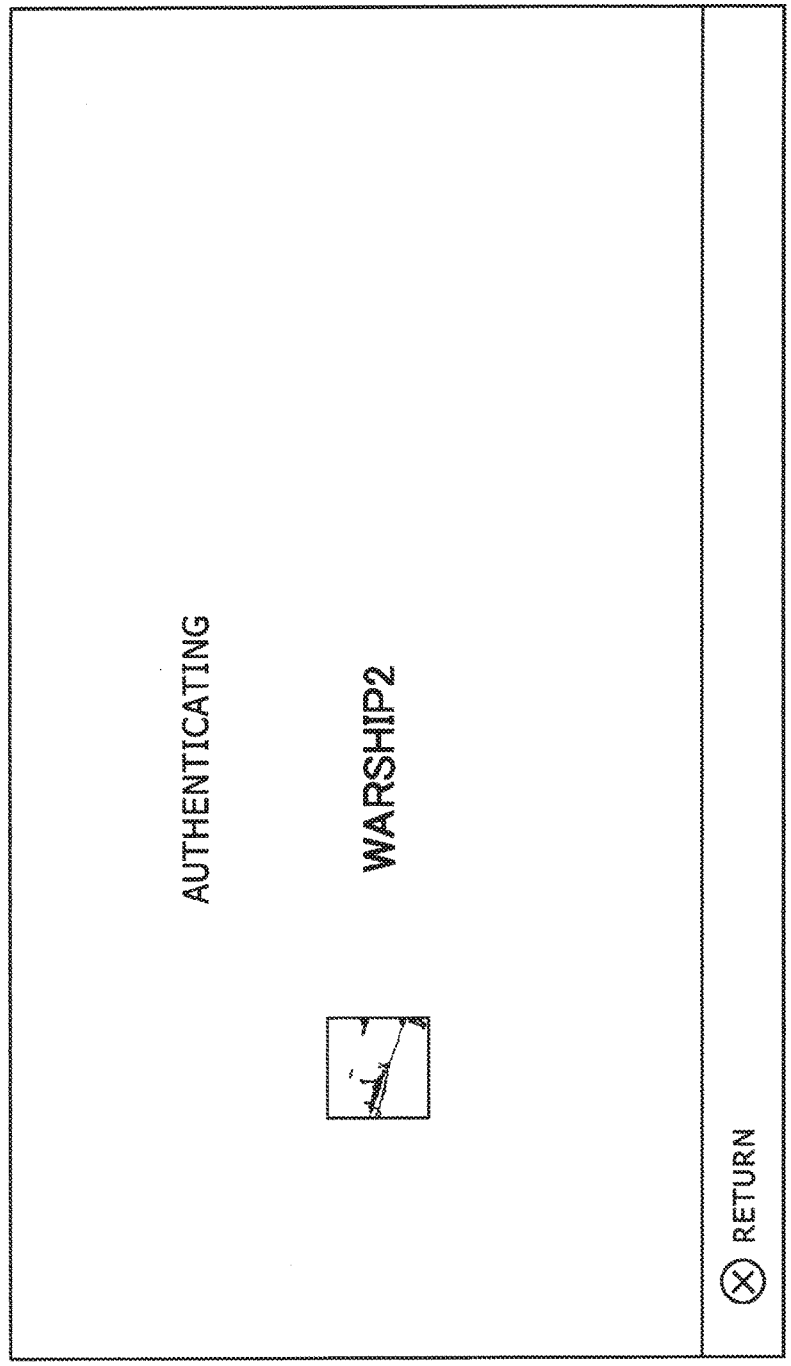
FIG. 9 is a diagram illustrating an example of a notifying screen.

FIG. 9 illustrates an example of a notifying screen displayed during user authentication by the cloud server 14. While the notifying screen illustrated in FIG. 9 is displayed on the output device 4, the cloud server 14 checks whether or not the user has the license information of "WARSHIP2."

Figure 10:
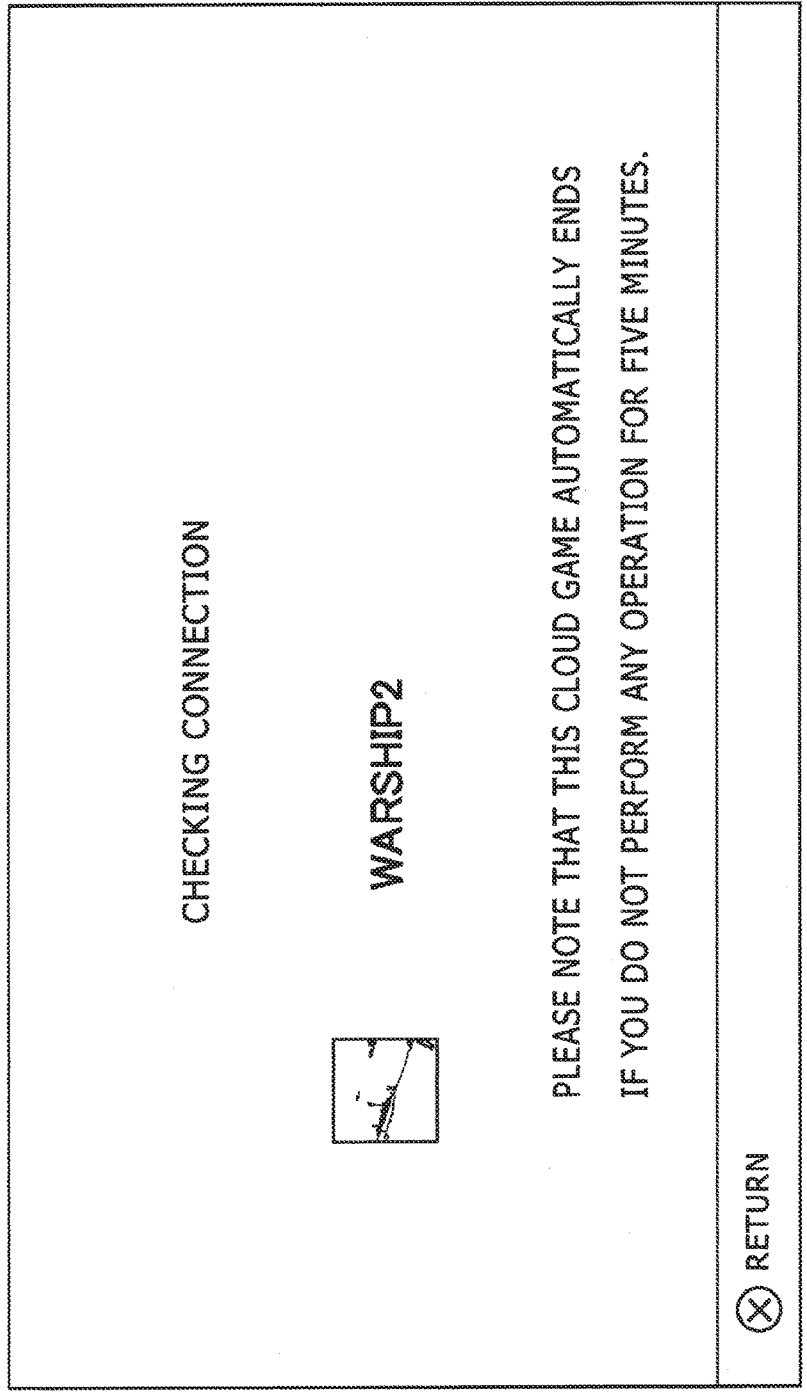
FIG. 10 is a diagram illustrating an example of a notifying screen.

FIG. 10 illustrates an example of a notifying screen displayed during the checking of the communication environment by the cloud server 14. While the notifying screen illustrated in FIG. 10 is displayed on the output device 4, the cloud server 14 checks the communication environment between the client terminal 10 of the user and the cloud server 14. Here, the cloud server 14 checks a communication bandwidth and latency, and thereby checks whether or not the cloud game can be executed in the communication environment.

Incidentally, as illustrated in the figure, the notifying screen displays information indicating that the cloud game will be ended automatically when there is a non-operation period of five minutes. This is based on a policy for efficiently operating limited calculation resources (processing units 204). An upper limit of the non-operation period is not limited to five minutes. The cloud server 14 notifies the user of the description related to the non-operation period while checking the connection.

Description in the following will be made of the UI in a case where no problem is found as a result of these checks.

Returning to FIG. 5, in the cloud server 14, when the request obtaining block 222 receives the execution request from the store server 12 via the communicating unit 202, the assignment processing section 212 assigns one processing unit 204 to the user. The operation monitoring section 210 monitors the operating conditions of the plurality of processing units 204. The operation monitoring section 210 therefore grasps whether or not there is an unassigned processing unit 204, that is, whether or not there is an assignable processing unit 204. When there is an assignable processing unit 204, as already described, the assignment processing section 212 assigns the processing unit 204 to the user, and transmits the request to execute the application (game "WARSHIP2" in this case) to the processing unit 204. The processing unit 204 reads the disk image of the application from the database 16, and starts the application.

In the client terminal 10, the output processing section 138 obtains a result of processing of the processing unit 204 via the communicating unit 102, and outputs, for reproduction, the result of processing of the processing unit 204 to the output device 4. When the user operates the input device 6, operation information is received by the receiving section 110. The operation information transmitting block 124 transmits the operation information to the cloud server 14 via the communicating unit 102. In the cloud server 14, the operation information obtaining block 224 obtains the operation information, and the operation information providing section 230 provides the operation information to the processing unit 204 assigned to the user. The processing unit 204 executes the game program on the basis of the provided operation information. The processing result transmitting block 242 encodes a resultant processing result, and transmits the processing result to the client terminal 10. Thus, in the game system 1 according to the present embodiment, the application is processed by the calculation resources (processing unit 204) of the cloud server 14, and the processing result is provided to the client terminal 10. Therefore the user can enjoy the application even when the client terminal 10 does not retain the application program.

On the other hand, at the point in time that the request obtaining block 222 receives the request to execute the application from the store server 12 via the communicating unit 202, a result of monitoring of the operating conditions of the plurality of processing units 204 by the operation monitoring section 210 may indicate that there is no assignable processing unit 204. For example, when the cloud server 14 has 10000 processing units 204, and all of the 10000 processing units 204 have already been assigned to users and are being used, the operation monitoring section 210 grasps that there is no assignable processing unit 204. Even if there is an unassigned processing unit 204, when the processing unit 204 is to be assigned to a specific user (for example a premium user), and the user "TARO" who desires to play "WARSHIP2" is not a premium user, the operation monitoring section 210 knows that there is no processing unit 204 usable by the user.

When there is no assignable processing unit 204, the user is in a waiting state until a processing unit 204 usable by the user is freed, the processing unit 204 is assigned to the user, and the application is started. The assignment processing section 212 manages the user in the waiting state together with the position of the user in order of waiting. Specifically, the assignment processing section 212 stores information (user ID) identifying the user and the position in the order of waiting in association with each other. The wait information transmitting block 244 transmits information indicating the number of people waiting at the point in time to the client terminal 10.

Figure 11:
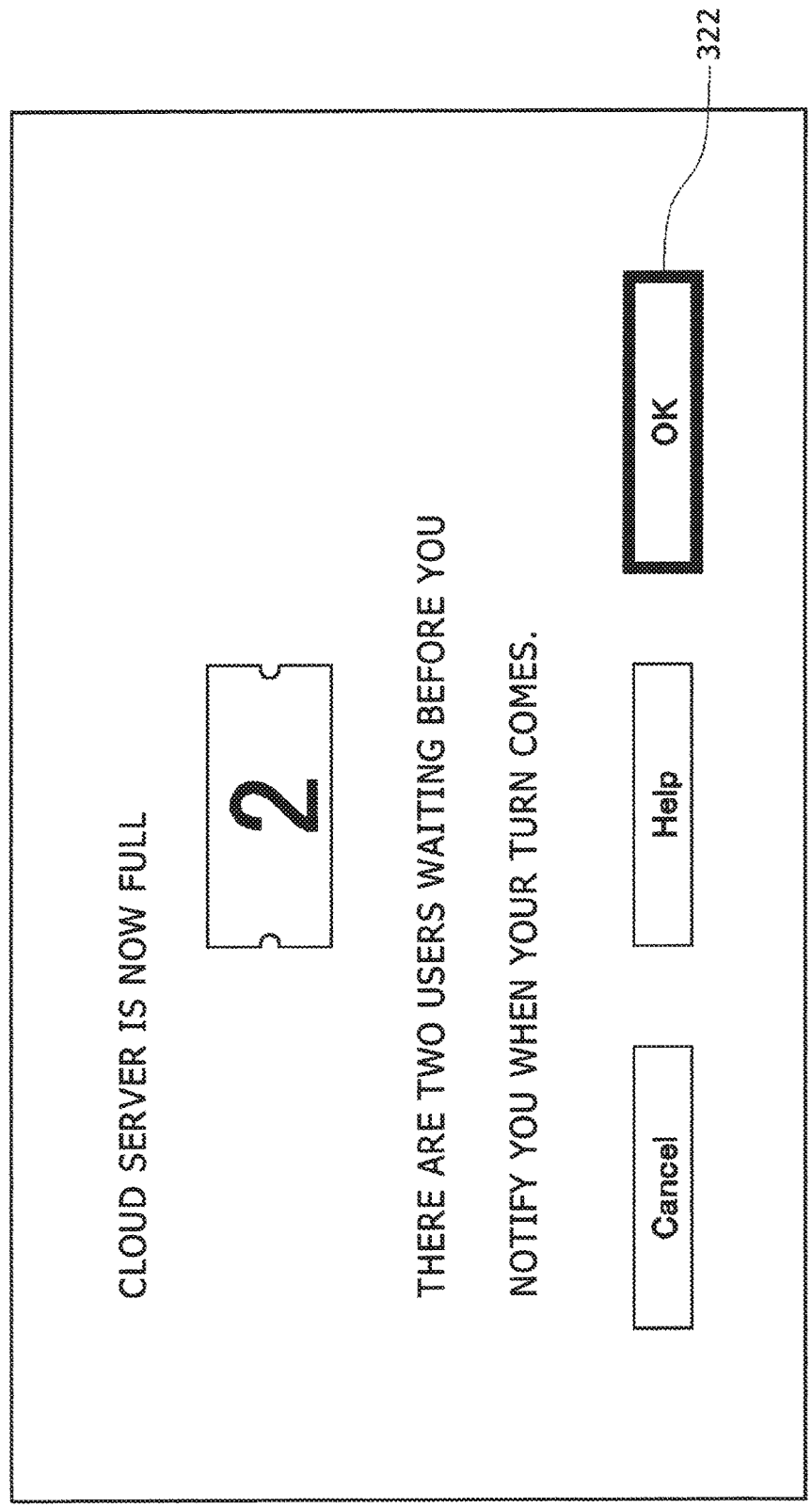
FIG. 11 is a diagram illustrating an example of a notifying screen.

FIG. 11 illustrates an example of the notifying screen notifying the number of waiting people. The notifying screen makes a notification that there are two users waiting before the user. The wait information transmitting block 244 receives the number of already waiting users from the assignment processing section 212, and transmits the number of already waiting users as wait information to the client terminal 10. In the client terminal 10, the notifying section 134 displays the transmitted number of waiting people on the output device 4. When the user sets a focus frame 322 to "OK," and operates the determining button of the output device 4, the request transmitting block 122 transmits information indicating consent to wait (waiting request) to the cloud server 14. When the request obtaining block 222 obtains the waiting request, the assignment processing section 212 manages the user ID of the user and the position (third in the present example) in the waiting order in association with each other.

Incidentally, while the above description has been made of a case where the wait information transmitting block 244 transmits the number of waiting people as the wait information, the assignment processing section 212 may for example estimate a time taken before the user "TARO" can play the game from the number of waiting people, and the wait information transmitting block 244 may transmit the estimated waiting time as the wait information to the client terminal 10. In this case, the client terminal 10 displays the estimated waiting time on the notifying screen. Thus, the wait information transmitting block 244 can transmit the information on the wait for application processing to the client terminal 10, and the client terminal 10 can display the transmitted information on the wait on the output device 4.

Figure 12:
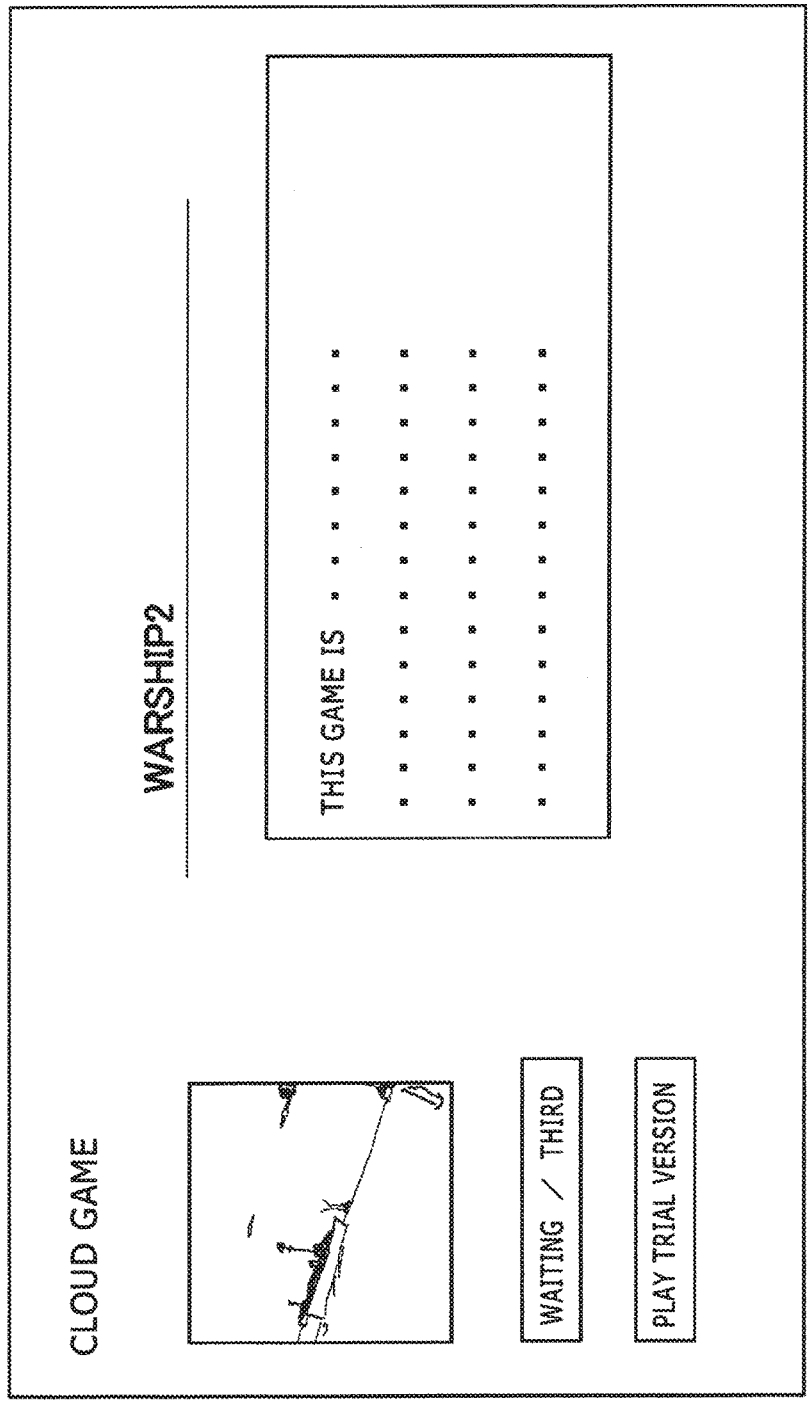
FIG. 12 is a diagram illustrating another example of the rental screen.

When the user presses an "OK" button on the notifying screen illustrated in FIG. 11, a return is made to the rental screen. FIG. 12 illustrates the rental screen to which the return is made from the notifying screen illustrated in FIG. 11. The rental screen in this case indicates that the user "TARO" is "waiting," and that the position in the order of waiting is "third." This rental screen is provided from the store server 12. In the server system 5, information indicating that the user is waiting and that the user is at the third waiting position is notified from the cloud server 14 to the store server 12. The position in the order of waiting is thus also displayed on the rental screen. Incidentally, when the functions of the operation monitoring section 210 and the assignment processing section 212 are provided to the store server 12, the store server 12 manages the waiting of the user "TARO," and therefore the store server 12 does not need to receive the waiting notification from the cloud server 14. When the user operates the home button 80 of the input device 6 in the state in which the rental screen is displayed on the output device 4, the home screen is displayed on the output device 4.

Figure 13:
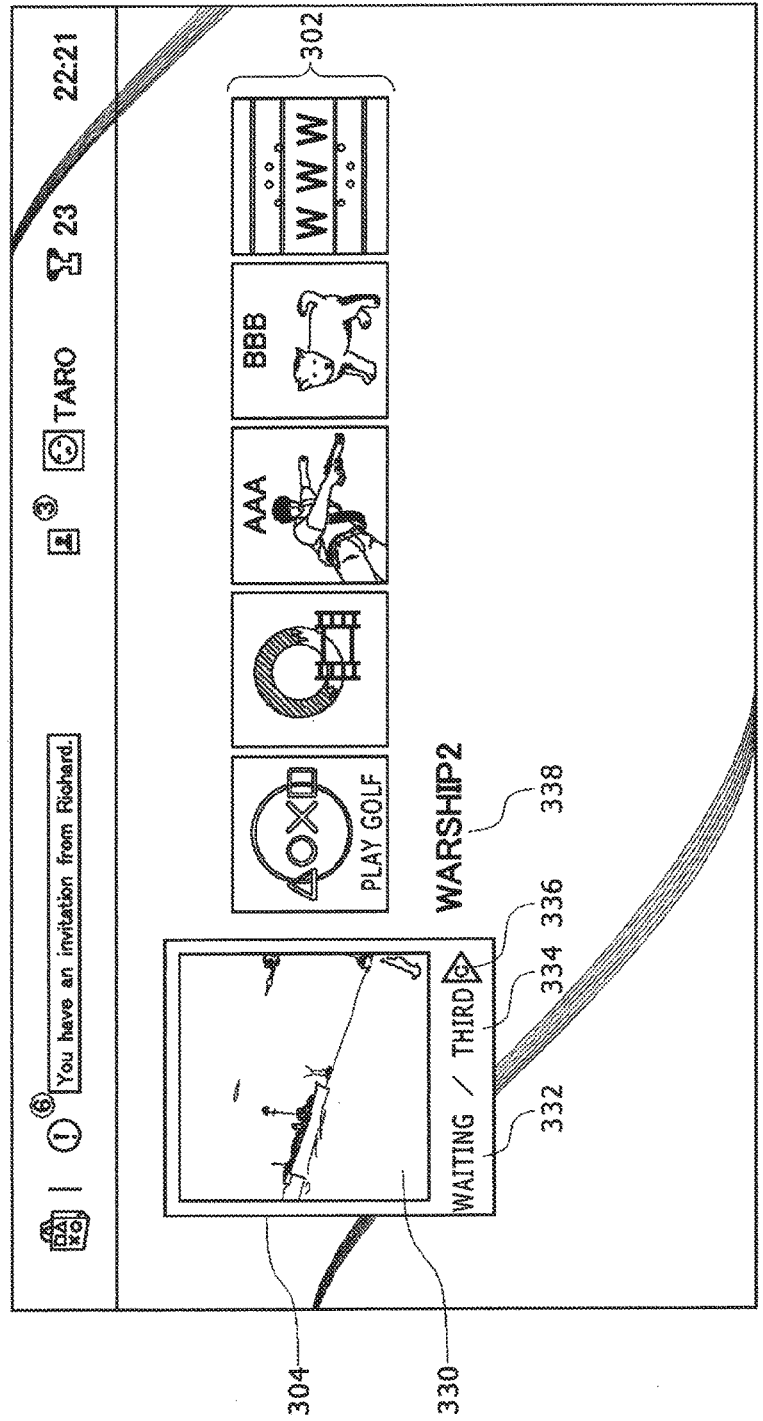
FIG. 13 is a diagram illustrating another example of the home screen.

FIG. 13 illustrates another example of the home screen. On the home screen, the icon display section 132 displays the icon images of a plurality of applications side by side in the icon row 302. The icon image displayed in the focus frame 304 in this case is the icon image of the cloud game for which the user has obtained the license at the store server 12 (cloud game icon 330). The game program corresponding to this cloud game icon 330 is not retained in the client terminal 10. Hence, the cloud game icon 330 is used, as it were, as a shortcut for being provided with the cloud game in the cloud server 14.

The icon display section 132 thus displays the icon image (cloud game icon 330) of the application processable by the server system 5 side by side with the icon images of applications processable by the application executing section 136. The user can therefore check the games processed by the client terminal 10 and the game processed by the cloud server 14 within one home screen.

The icon display section 132 displays a cloud category icon 336 indicating a cloud game and title information 338 in association with the cloud game icon 330. The display of the cloud category icon 336 enables the user to recognize that the game in question is a cloud game.

In addition, the icon display section 132 adds and displays information on the wait, specifically a wait indicator 332 indicating that a present status is a waiting status and order information 334 indicating the position of the user in the order of waiting, in association with the cloud game icon 330 waiting for a start of processing. The user can thereby recognize that the user is currently waiting and that the position in the waiting order is the third.

In FIG. 13, while the user is waiting for the cloud game, the icon display section 132 displays the wait information in association with the cloud game icon 330. The icon display section 132 adds various information to the cloud game icon 330 also during other than the waiting period. Other examples of information displayed in association with the cloud game icon 330 will be illustrated in the following.

Figure 14:
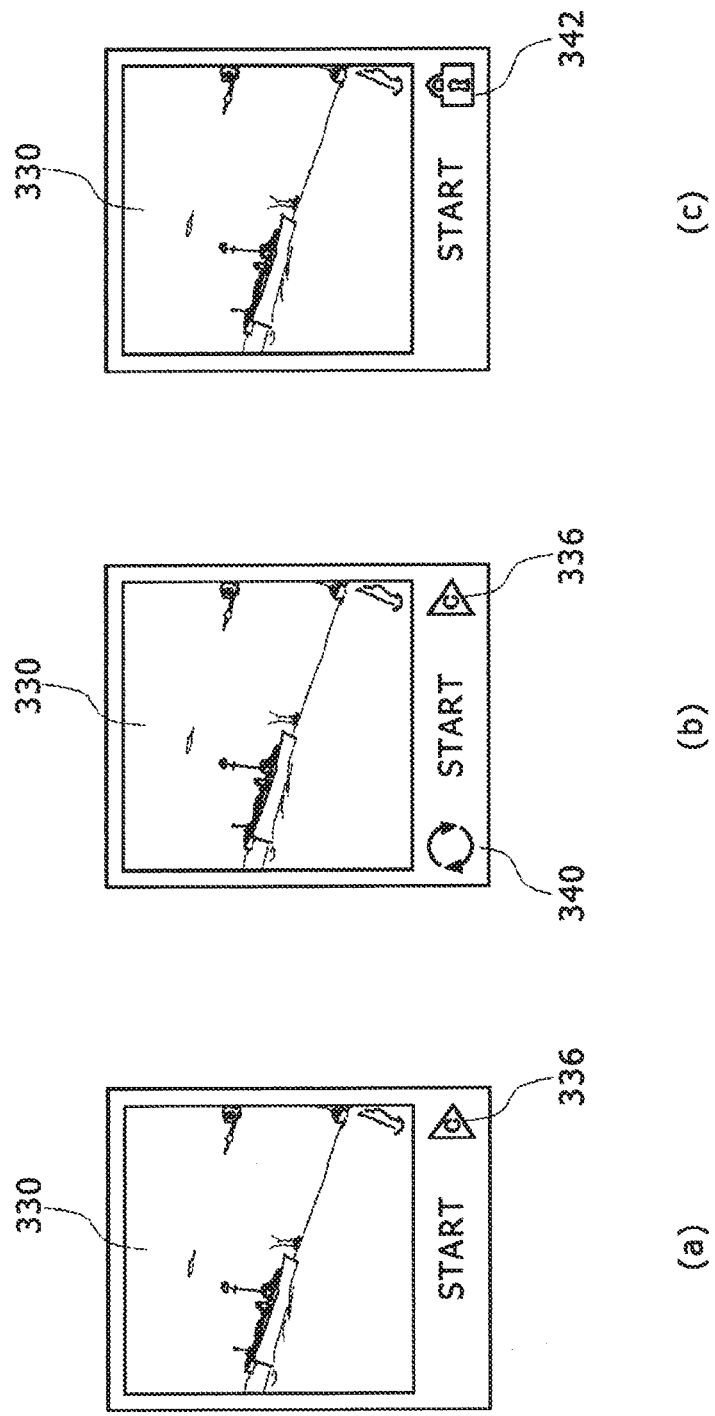
FIG. 14 is a diagram illustrating an example of display of a cloud game icon.

FIG. 14(a) illustrates an example of display of the cloud game icon 330 used as a shortcut. The cloud category icon 336 is displayed in association with the cloud game icon 330. When the user operates the determining button of the input device 6 in a state in which the cloud game icon 330 is disposed in the focus frame 304, the receiving section 110 receives an application execution request, and the request transmitting block 122 transmits the execution request to the server system 5. The execution request may be obtained by the store server 12, and transferred to the cloud server 14. However, the execution request may be directly obtained by the cloud server 14. When the request obtaining block 222 receives the application execution request in the cloud server 14, as already described, the cloud server 14 checks whether the user has a proper license, and checks the communication environment between the client terminal 10 and the cloud server 14. Thereafter, when there is an assignable processing unit 204, the processing unit 204 processes the application, and the processing result transmitting block 242 transmits a result of the processing to the client terminal 10. Thus, the cloud game icon 330 illustrated in FIG. 14(a) can be used as a shortcut for the cloud game.

FIG. 14(b) illustrates another example of display of the cloud game icon 330. Together with the cloud category icon 336, an execution indicator 340 indicating that the application is being executed is displayed in association with the cloud game icon 330. The execution indicator 340 is added to the cloud game icon 330 and displayed when the user returns to the home screen while provided with the application processing result from the cloud server 14. The user can therefore confirm that the cloud game is being played. Incidentally, by performing a determining operation of the cloud game icon 330 to which the execution indicator 340 is added, the user can directly return to the game screen provided from the cloud server 14.

FIG. 14(c) illustrates another example of display of the cloud game icon 330. Instead of the cloud category icon 336, a key icon 342 indicating that the cloud game cannot be played at present is displayed in association with the cloud game icon 330. This key icon 342 is displayed for example when the license has expired or when the use of the application is limited by parental control information. When the license has expired, and the user performs an operation of selecting the cloud game icon 330, the store server 12 provides a license purchase screen. By obtaining the license, the user can be provided with the cloud game service.

The client terminal 10 according to the present embodiment has a function of executing a plurality of applications simultaneously. After display of the home screen illustrated in FIG. 13 on the output device 4 during the wait for the cloud game service, the user can enjoy one or more applications arranged in the icon row 302.

When the user moves the icon row 302 by one step to the left on the home screen illustrated in FIG. 13, the icon row 302 illustrated in FIG. 6 is displayed. When the user operates the determining button of the input device 6 in the state in which the icon image of the game "play golf" is disposed in the focus frame 304, the application executing section 136 in the client terminal 10 starts the processing of the game "play golf." This game is installed in the auxiliary storage device 2. The application executing section 136 reads the program from the auxiliary storage device 2, and starts "play golf." Incidentally, the game program may be read from the ROM medium 44.

Figure 15:
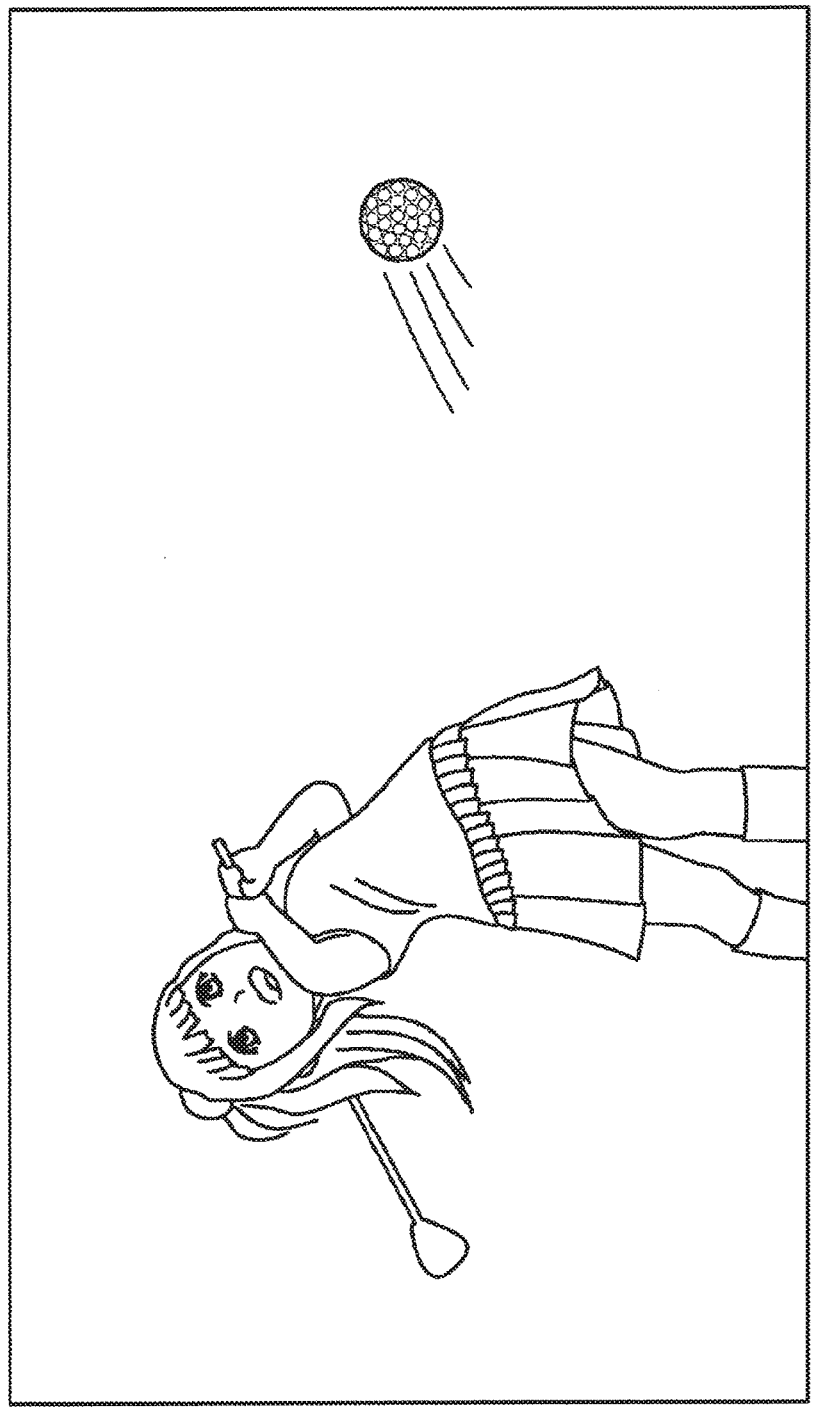
FIG. 15 is a diagram illustrating an example of a local application execution screen.

FIG. 15 illustrates an example of a local application execution screen. The receiving section 110 receives an input of the user by the input device 6, that is, operation information. The application executing section 136 reflects the operation information in the processing of the application, and generates an application screen and application sound. The output processing section 138 outputs the generated screen and the generated sound from the output device 4. The application executing section 136 can thus start the processing of another application in the state of waiting for a start of processing of the cloud game in the server system 5. Incidentally, another application in this case refers to a specific kind of application, for example a game application, and does not include a player application or the like. The user can therefore enjoy a game retained in the client terminal 10, instead of merely waiting for the turn of the user during the wait.

In the cloud server 14, the assignment processing section 212 manages the user IDs of users waiting for the cloud service and the positions of the users in waiting order. The operation monitoring section 210 monitors the operating conditions of the processing units 204. When a processing unit 204 is freed, and at least one processing unit 204 becomes assignable to a waiting user, the ID (unit ID) of the assignable processing unit 204 is notified to the assignment processing section 212. Cases where a processing unit 204 is freed include cases where a game is ended, that is, cases where a user playing the game voluntarily ends the game and cases where a game is forcibly ended when the non-operation period of the user has exceeded a predetermined time, as will be described later. When a processing unit 204 becomes assignable, the assignment processing section 212 assigns the processing unit to a first user in the waiting order. The assignment processing section 212 thus manages the assignment of processing units 204 to users.

In the example described above, there are two users already waiting before the user "TARO." Hence, at a point in time that the waiting request is transmitted to the cloud server 14, the user "TARO" is managed as a third waiting user in the assignment processing section 212. When the assignment processing section 212 assigns the processing unit 204 to the first waiting user, the wait information transmitting block 244 is notified from the assignment processing section 212 that the position of the user "TARO" in the waiting order has become a second position, and transmits information to that effect to the client terminal 10. Thus, when the home screen is displayed on the output device 4, the information indicating that the position in the waiting order is the second is displayed in association with the cloud game icon 330. In addition, when another processing unit 204 becomes assignable, the assignment processing section 212 assigns the processing unit to the first user in the waiting order. At this time, the turn of the user "TARO" comes next. The wait information transmitting block 244 transmits information indicating that the turn of the user "TARO" comes next to the user "TARO" who has become the first in the waiting order.

Figure 16:
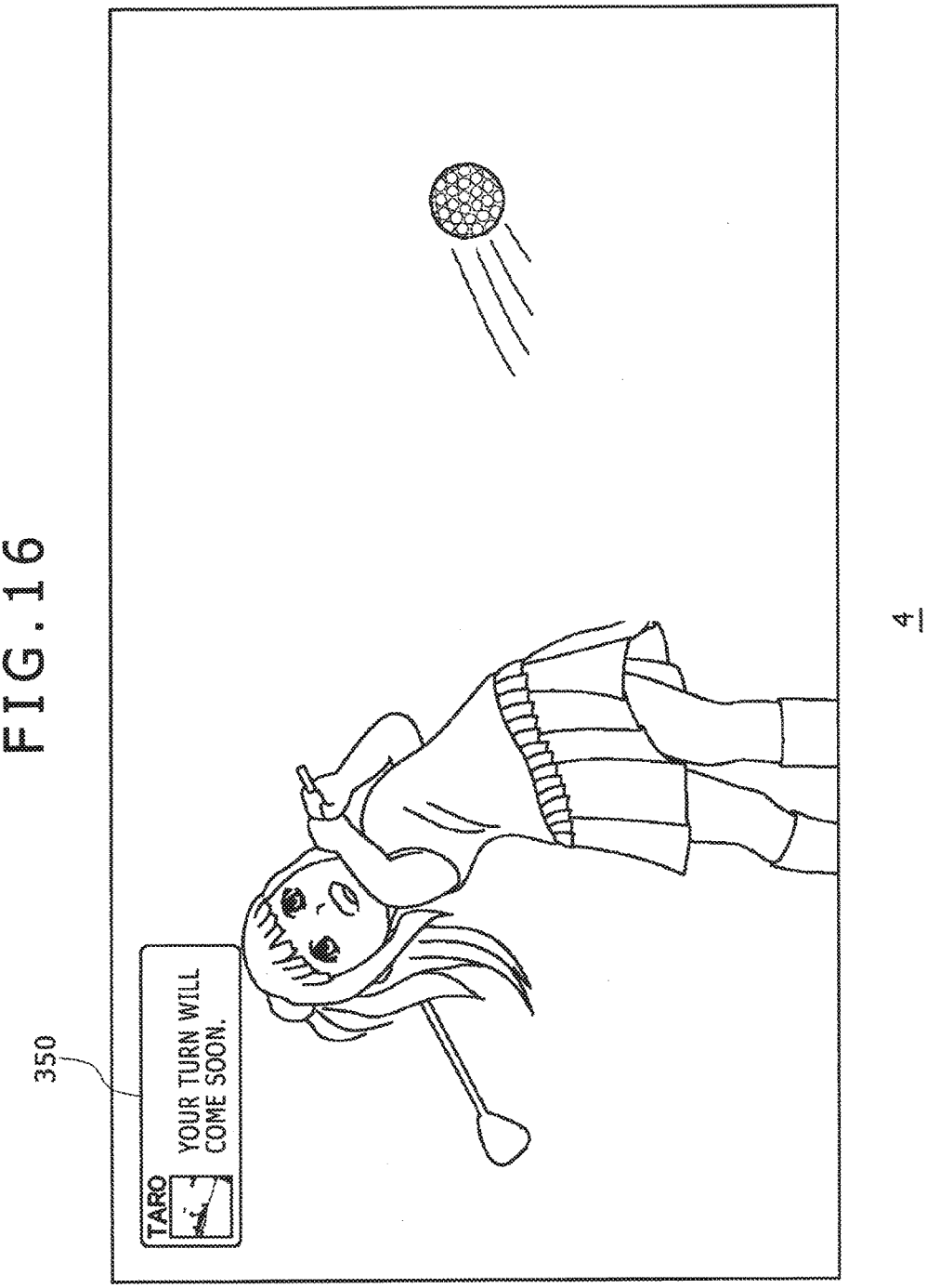
FIG. 16 is a diagram illustrating advance notice information.

FIG. 16 illustrates advance notice information displayed on the local application processing screen. The notifying section 134 displays the advance notice information 350 indicating that the turn will come soon in a state of being superimposed on the application screen. Seeing this advance notice information 350, the user recognizes that the user will be able to play the cloud game soon.

When yet another processing unit 204 becomes usable in the cloud server 14, and the processing unit 204 becomes assignable to the user "TARO," the processing possible information transmitting block 246 transmits information indicating that the processing of the application can be started to the client terminal 10. In the client terminal 10, when the obtaining section 130 obtains the information indicating that the processing of the application can be started from the cloud server 14, the notifying section 134 notifies the user that the processing of the application will be started.

Figure 17:
FIG. 17 is a diagram illustrating start notifying information.

FIG. 17 illustrates start notifying information notifying a start of the application in the cloud server 14. The notifying section 134 displays the start notifying information 352 indicating that the turn of the user has come in a state of being superimposed on the application screen. Seeing this start notifying information 352, the user recognizes that the turn of the user has come. In this case, when the user operates the home button 80 of the input device 6, or after 15 seconds has passed after the display of the start notifying information 352, a cloud game start screen is displayed on the output device 4.

Figure 18:
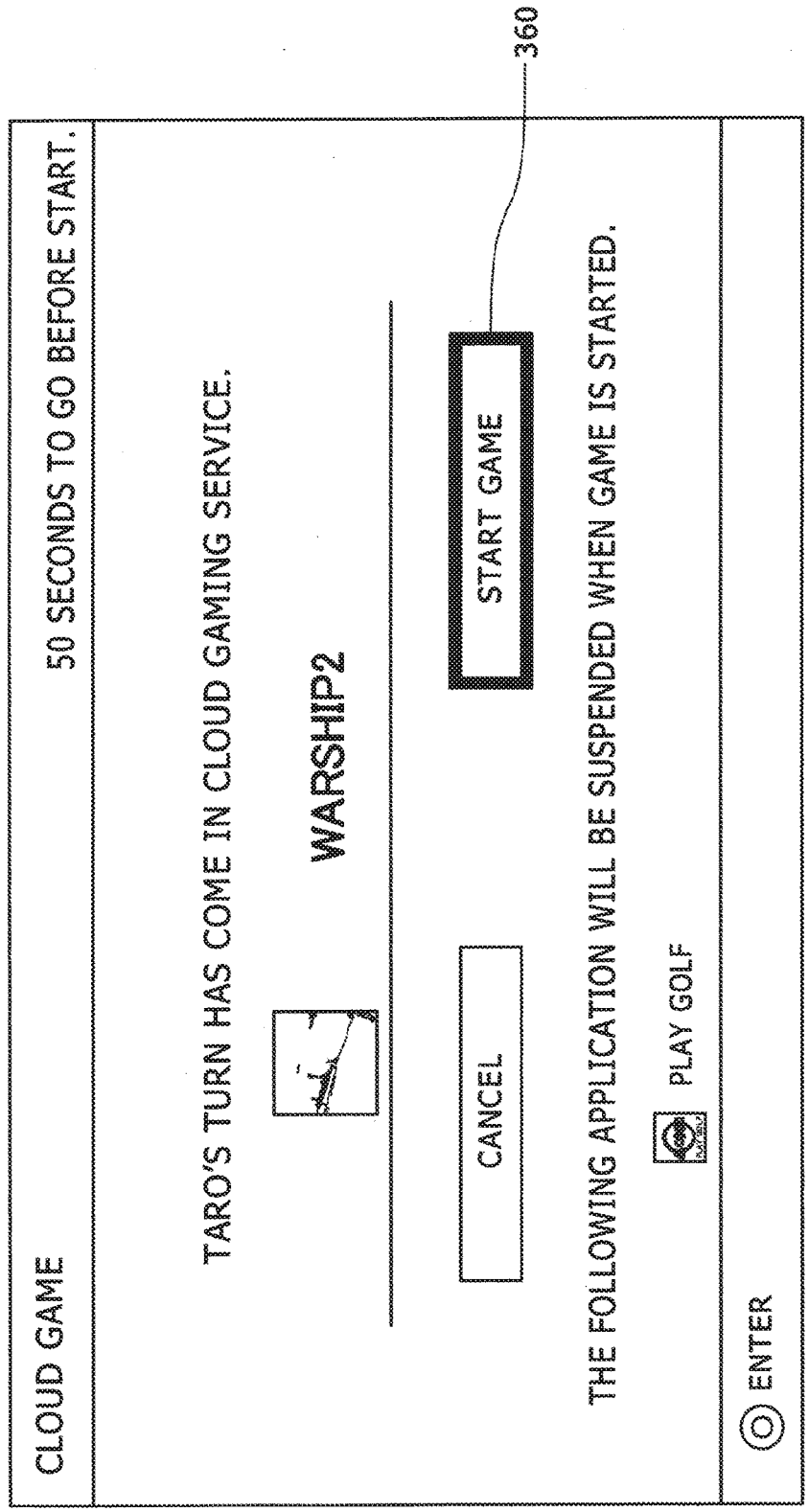
FIG. 18 is a diagram illustrating an example of a cloud game start screen.

FIG. 18 illustrates an example of the cloud game start screen. This start screen displays options for inquiring whether to start the processing of the application in the server system 5. Specifically, when the obtaining section 130 obtains the information indicating that the processing of the cloud game can be started from the cloud server 14, the notifying section 134 displays the start notifying information 352 on the application screen, and thereafter displays the start screen inquiring whether or not to start the processing of the cloud game on the output device 4. As will be described later, this start screen is displayed when a predetermined kind of application such as a game application or the like is being processed in the application executing section 136. When the predetermined kind of application is being processed, the notifying section 134 displays the start screen on the output device 4. Incidentally, the notifying section 134 may instruct the cloud server 14 to wait for a start of the cloud game until a request to start the game is generated on the start screen. The start screen illustrated in FIG. 18 displays two buttons "START GAME" and "CANCEL." The user selects one of the buttons by moving a focus frame 360.

When the user is to start the cloud game, the user sets the focus frame 360 to "START GAME," and operates the determining button of the input device 6 (circle button 72). The receiving section 110 receives this button operation as a request to start the cloud game. The request transmitting block 122 transmits the start request to the cloud server 14. Incidentally, when a start of the cloud game in the server system 5 is selected in the case where the application executing section 136 is processing an application, the processing by the application executing section 136 is suspended. Hence, in this case, the notifying section 134 notifies the user that the predetermined application being executed will be suspended.

Figure 19:
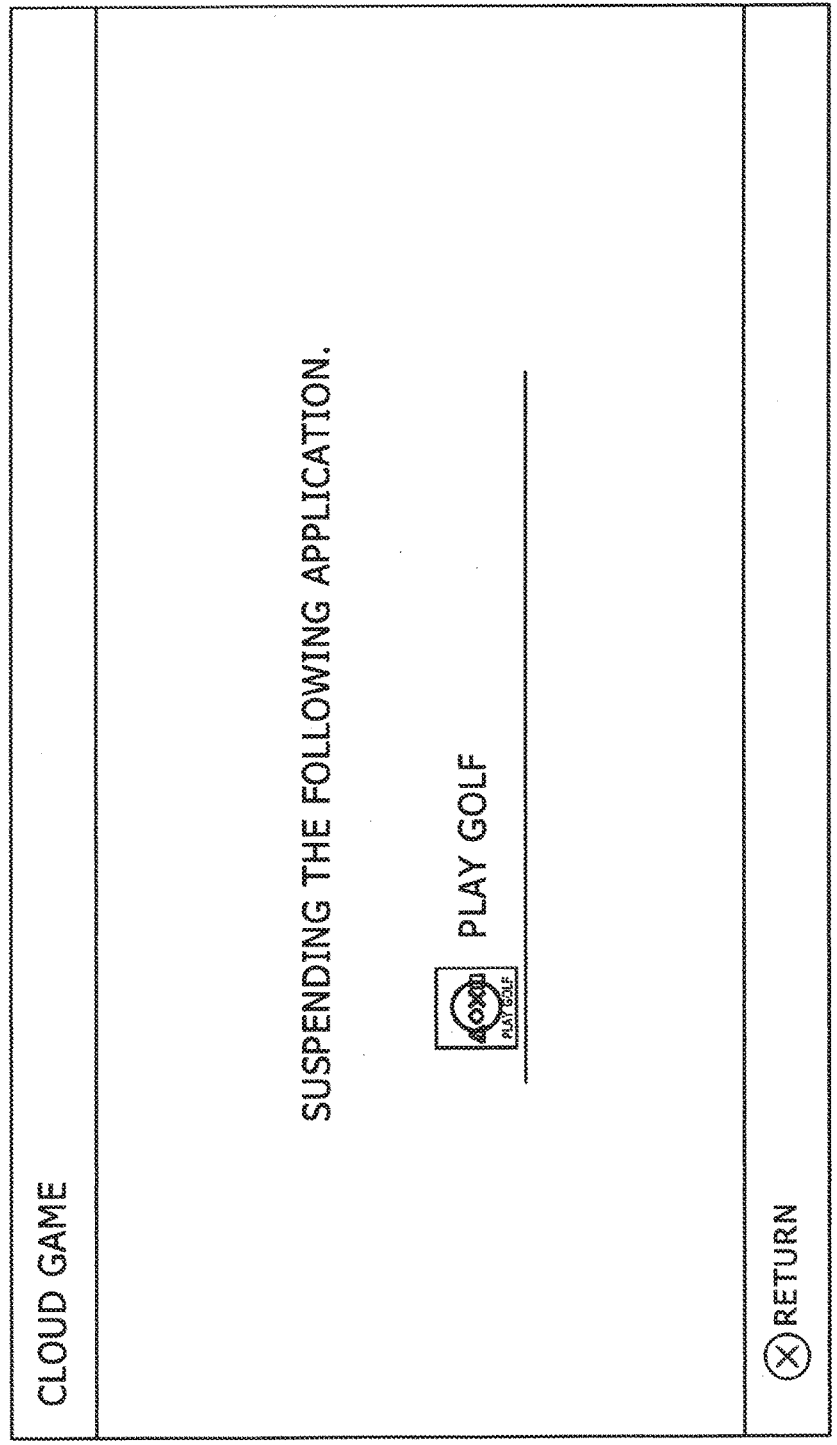
FIG. 19 is a diagram illustrating an example of a screen notifying the suspension of an application being executed.

FIG. 19 illustrates an example of a screen notifying the suspension of the application being executed. The notifying screen displays the title of the application to be suspended as the cloud game is started. In the above-described example, the application executing section 136 is processing the game "play golf." A notification is therefore made which indicates that this game will be suspended. After display of the notifying screen, the notifying section 134 displays a notification indicating that the cloud game will be started. In the cloud server 14, when the request obtaining block 222 obtains the game start request, the assignment processing section 212 assigns a processing unit 204 to the user "TARO," and makes the processing unit 204 start processing of the game application identified by the execution request.

The processing unit 204 assigned to the user "TARO" reads the program of the game "WARSHIP2" from the database 16, and starts the processing.

Figure 20:
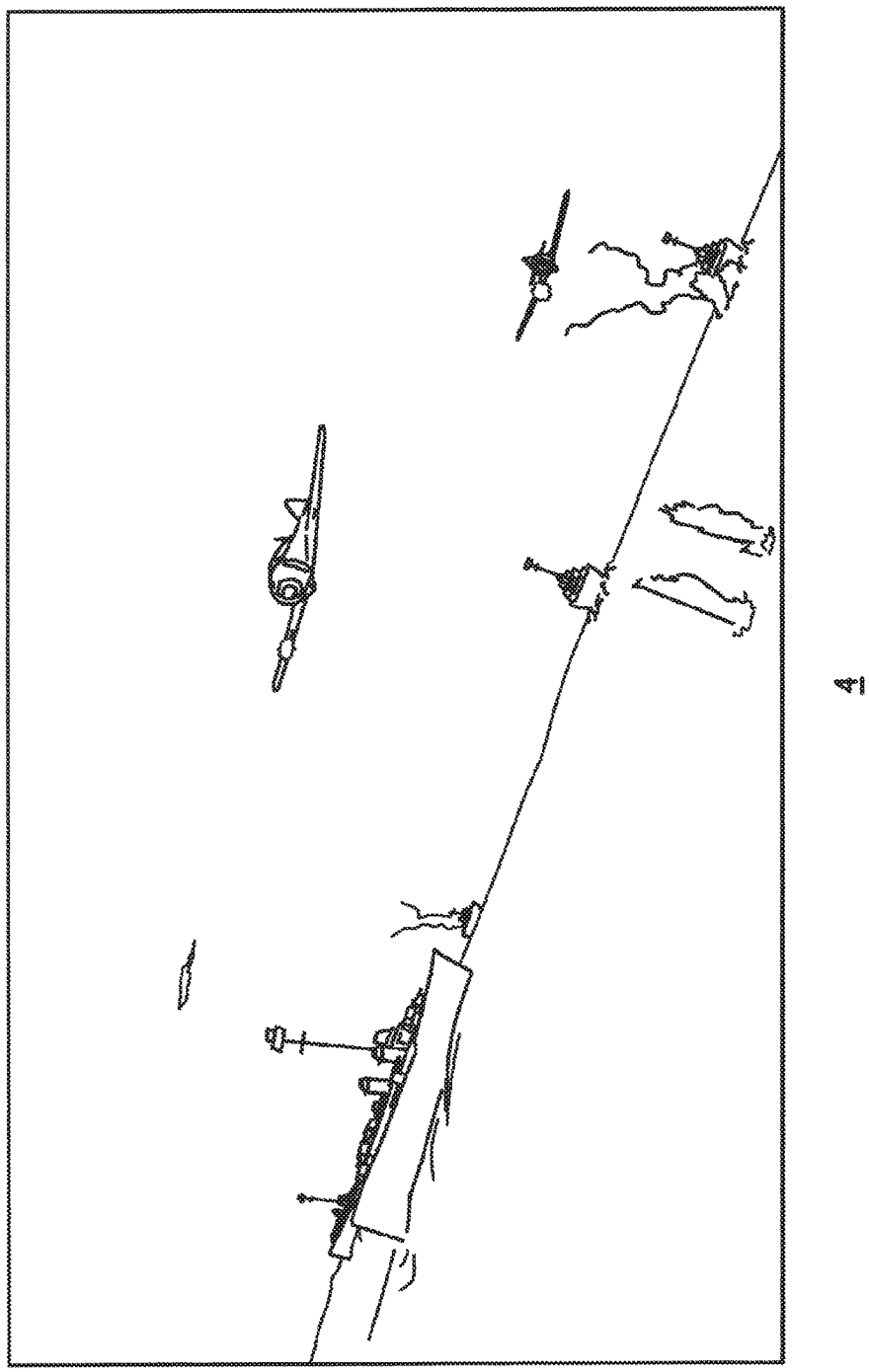
FIG. 20 is a diagram illustrating an example of a game image generated by a processing unit.

FIG. 20 illustrates an example of a game image generated by the processing unit 204. When the processing unit 204 processes the application, the processing result transmitting block 242 encodes a result of the processing, and performs streaming distribution of the result of the processing to the client terminal 10. The output processing section 138 in the client terminal 10 outputs the game image generated by the processing unit 204 from the output device 4.

Incidentally, in the above example, description has been made of a case where the turn of the user comes while the application executing section 136 is processing an application. However, the turn of the user may come in a case where application processing by the application executing section 136 is not performed. For example, there is a case where the home screen is displayed on the output device 4 without the user executing an application. In this case, when the obtaining section 130 obtains information indicating a start of processing of an application from the cloud server 14, the notifying section 134 may display the start notifying information 352 illustrated in FIG. 17 on the home screen, and thereafter the cloud game may be started immediately without the cloud game start screen being displayed. In a case where a predetermined kind of application processing by the application executing section 136 is not performed, the notifying section 134 does not instruct the cloud server 14 to wait for a start of the cloud game until the game start request is generated. Therefore the cloud server 14 automatically starts the cloud game without waiting for the start request from the user. When the application executing section 136 is thus not processing the predetermined application, there is no application to be suspended. It is thus desirable that the assignment processing section 212 immediately instruct the processing unit 204 to start processing the game application and thus make the processing unit 204 start processing the game application. Therefore, even when an application such for example as a browser or the like other than the predetermined kind of application has been started in the client terminal 10, the cloud server 14 may automatically start the cloud game without the browser being suspended.

Figure 21:
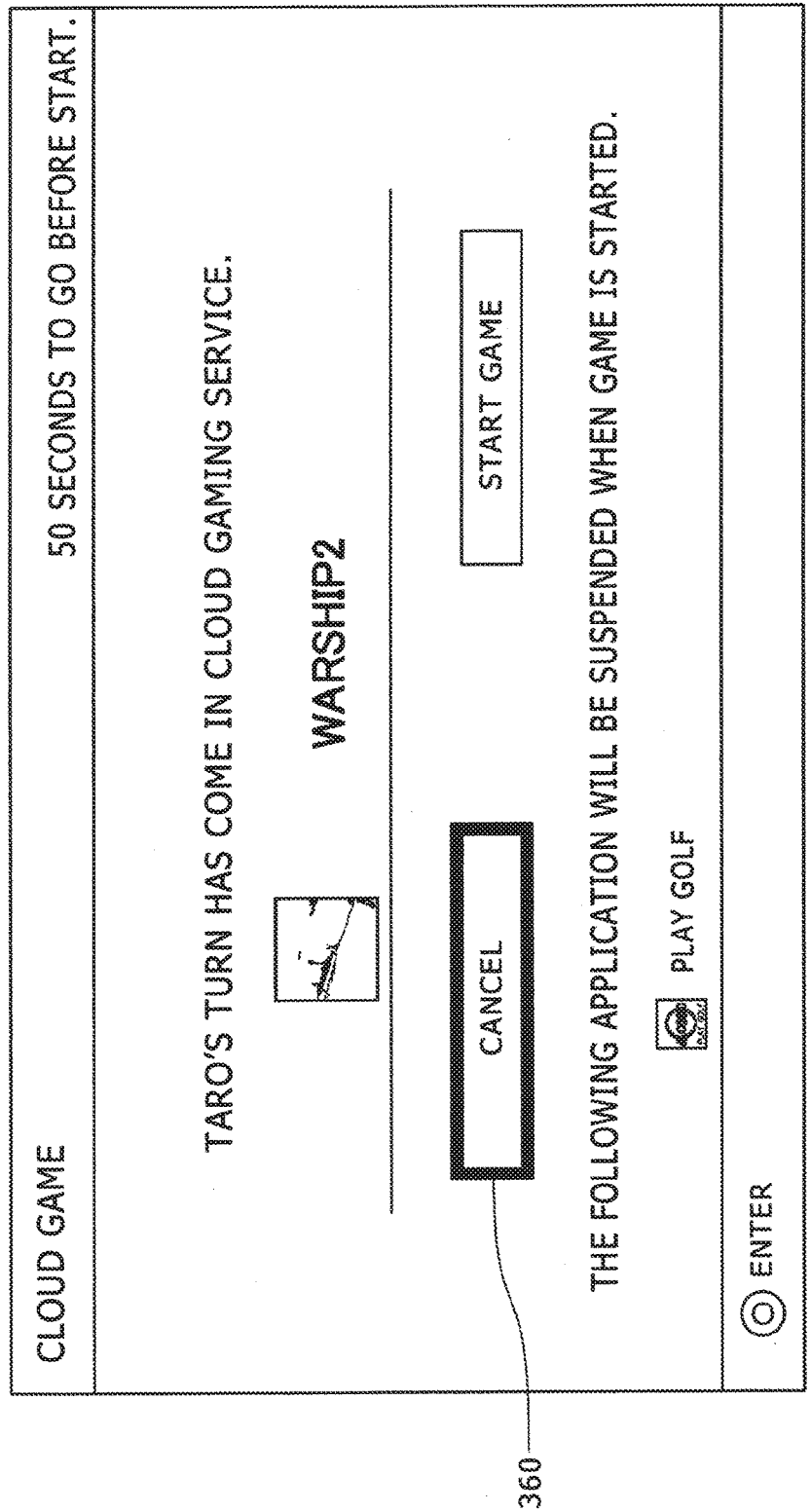
FIG. 21 is a diagram illustrating an example of a cloud game start screen.

FIG. 21 illustrates an example of the cloud game start screen. A difference from FIG. 18 lies in that the focus frame 360 is disposed on "CANCEL." When the user does not start the cloud game, but continues the application being executed locally, the user sets the focus frame 360 to "CANCEL," and operates the determining button of the input device 6 (circle button 72). The request transmitting block 122 transmits the operation information as a cancellation request to the cloud server 14. When the request obtaining block 222 in the cloud server 14 obtains the cancellation request, the assignment processing section 212 cancels the waiting state of the user "TARO," and ends the processing of assigning a processing unit 204. Thus, the assignment processing section 212 ends the processing of assigning a processing unit 204 to the user "TARO," and starts processing of assigning a processing unit 204 to another user waiting at a position following that of TARO in the waiting order. Incidentally, when the request obtaining block 222 obtains the cancellation request, the assignment processing section 212 may for example move back the user "TARO" to a predetermined position (for example a fifth position) in the waiting order and maintain the waiting state, rather than canceling the waiting state.

Figure 22:
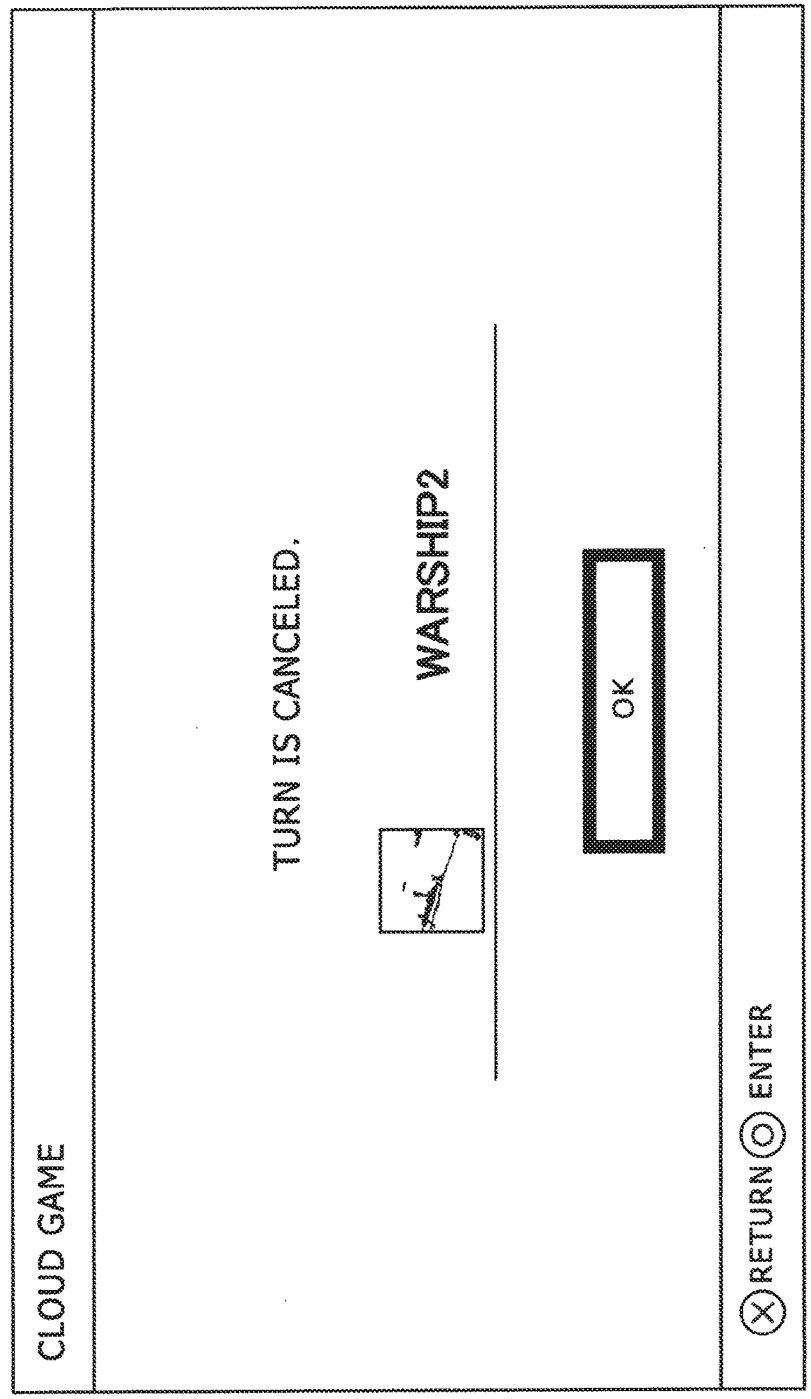
FIG. 22 is a diagram illustrating an example of a notifying screen.

FIG. 22 illustrates an example of a notifying screen notifying the cancellation of the wait for the cloud game. When the user operates the determining button of the input device 6 on the notifying screen, the output processing section 138 outputs a result of processing by the application executing section 136, that is, the game image of "play golf" from the output device 4. Incidentally, at this time, the waiting state of the user "TARO" in the cloud server 14 is canceled. Thus, when the user desires to play the cloud game again, the user needs to select the cloud game icon 330 (see FIG. 14(a)) on the home screen and be queued in the cloud server 14 again.

Incidentally, at a point in time that the notifying section 134 displays the start notifying information 352 on the output device 4 after the processing possible information transmitting block 246 transmits the processing possible information to the client terminal 10, the assignment processing section 212 has assigned a processing unit 204 to the user "TARO" (has reserved a processing unit 204, to be exact). Hence, during the display of the start screen illustrated in FIG. 18 or FIG. 21 after an end of display of the start notifying information 352 by the notifying section 134, the assignment processing section 212 cannot assign the processing unit 204 assigned to the user "TARO" to another user. Therefore, when the user "TARO" does not indicate an intention as to whether or not to start the cloud game on the start screen illustrated in FIG. 18 or FIG. 21, the state of the processing unit 204 being assigned to the user "TARO" is continued.

However, continuing the assignment of the processing unit 204 to the user when the user does not indicate an intention to start the cloud game or an intention to cancel the cloud game constitutes unnecessary use of the processing unit 204, and is therefore undesirable. Accordingly, when the operation monitoring section 210 monitors operation information from the client terminal 10, and determines that no operation information has been transmitted for a predetermined time, the assignment processing section 212 cancels the assignment of the processing unit 204 to the client terminal 10.

Accordingly, on the start screen (inquiry screen) illustrated in FIG. 18 or FIG. 21, when the operation monitoring section 210 monitors the arrival of operation information from the user "TARO," and determines that operation information (start request) indicating a start of processing of the application has not been input for a predetermined time, for example five minutes, the assignment processing section 212 cancels the waiting state of the user "TARO." At this time, the time-out information transmitting block 248 transmits time-out information indicating that the waiting state is canceled to the client terminal 10. When the obtaining section 130 in the client terminal 10 obtains the time-out information, the notifying section 134 displays a notifying screen illustrated in FIG. 22 on the output device 4 to make a notification that the waiting state of the user has been canceled. Time-out processing in the cloud server 14 is similar to processing when the user selects "CANCEL" on the start screen illustrated in FIG. 21. The assignment processing section 212 cancels the waiting state of the user "TARO," and ends the processing of assigning the processing unit 204. The assignment processing section 212 thereby starts processing of assigning the processing unit 204 to another user waiting at a position following that of TARO in the waiting order without assigning the processing unit 204 to the user "TARO."

Incidentally, when the operation monitoring section 210 determines that operation information (start request) indicating a start of processing of the application has not been input for a predetermined time, for example five minutes, the assignment processing section 212 may for example move back the user "TARO" to a predetermined position (for example a fifth position) in the waiting order and maintain the waiting state, rather than canceling the waiting state of the user "TARO."

This time-out processing is performed also after the start of the cloud game.

During the processing of the cloud game by the processing unit 204, the operation monitoring section 210 monitors the arrival of operation information from the user "TARO." When the operation monitoring section 210 determines that no operation information has been input for a predetermined time (for example five minutes), the assignment processing section 212 cancels the assignment of the processing unit 204 to the user.

For example, when the operation monitoring section 210 determines that a non-operation period has reached four minutes, for example, before the predetermined time passes, the time-out information transmitting block 248 transmits information indicating that there is one minute remaining before the time-out processing to the client terminal 10. The output processing section 138 ends the display of the application screen on the output device 4, and the notifying section 134 displays a countdown timer on the output device 4.

Figure 23:
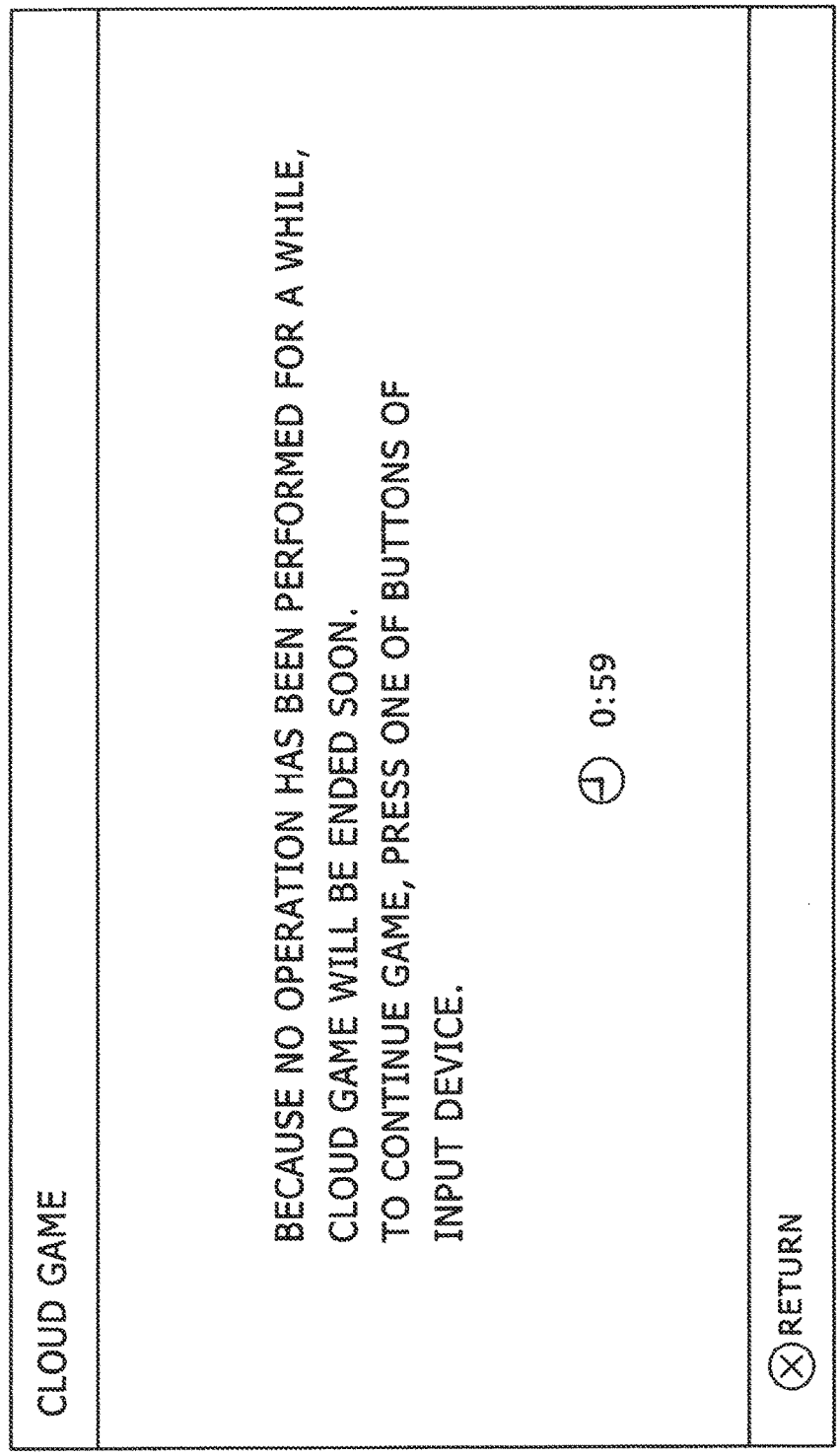
FIG. 23 is a diagram illustrating an example of countdown display.

FIG. 23 illustrates an example of countdown display. When viewing the countdown display, the user recognizes that the user needs to operate the input device 6. In this case, when the user operates one of the buttons of the input device 6 before an end of the countdown, the countdown of the non-operation period is stopped, and the output processing section 138 displays the application screen on the output device 4, so that the user can return to the game.

Figure 24:
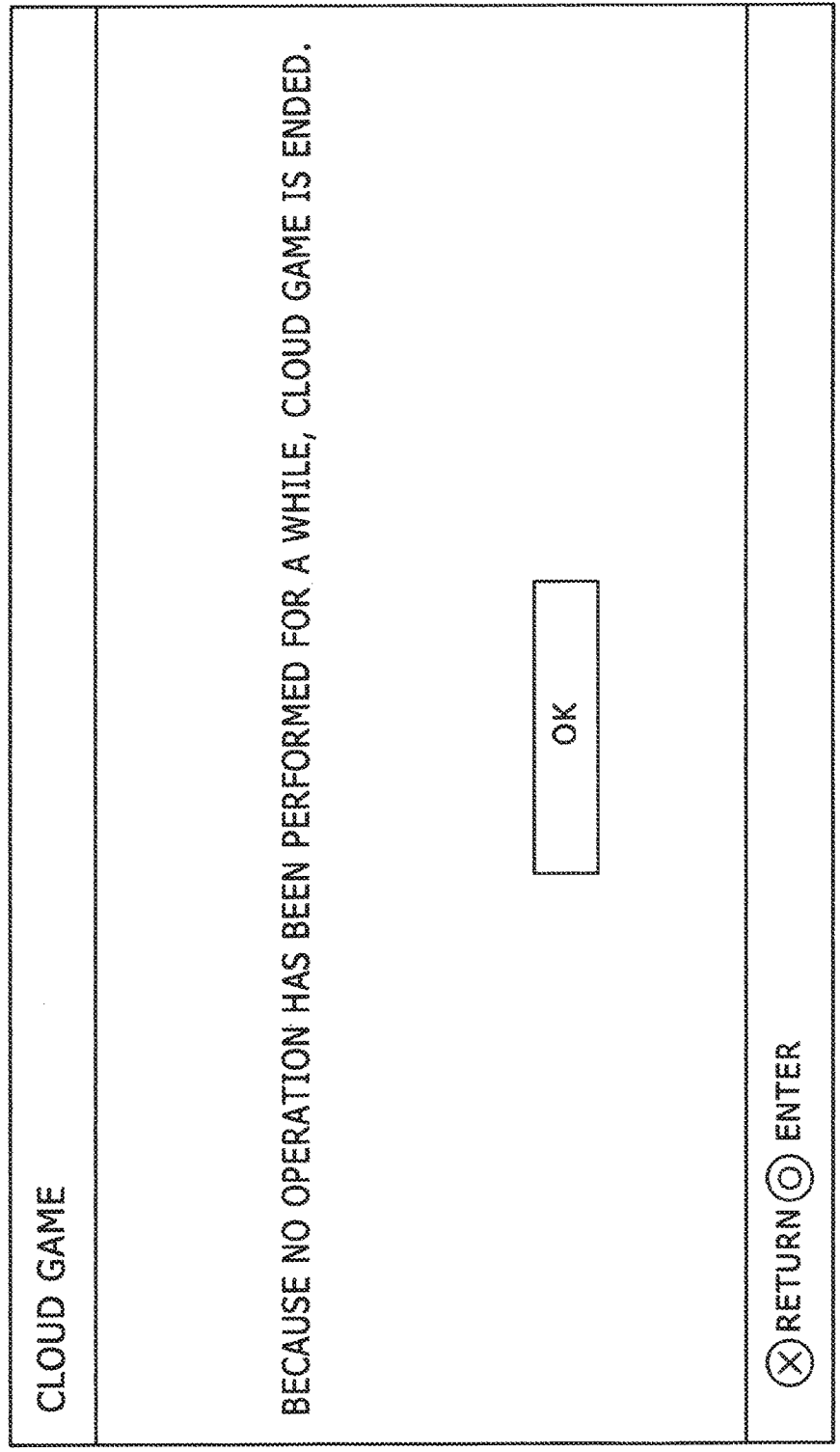
FIG. 24 is a diagram illustrating an example of a notifying screen.

FIG. 24 illustrates an example of a notifying screen making a notification that the non-operation period has expired and that the cloud game is ended. When the operation monitoring section 210 determines that the non-operation period has expired, the assignment processing section 212 ends the assignment of the processing unit 204 to the user, and the time-out information transmitting block 248 transmits the time-out information indicating that the assigned state is canceled to the client terminal 10. When the obtaining section 130 in the client terminal 10 obtains the time-out information, the notifying section 134 displays the notifying screen illustrated in FIG. 24 on the output device 4 to make a notification that the provision of the service of the cloud game is ended. This notification enables the user to know that the cloud game is ended. The assignment processing section 212 frees the processing unit 204 assigned to the user "TARO." Thereby the assignment processing section 212 performs processing of assigning the processing unit 204 to another waiting user.

An example has been illustrated above in which the operation monitoring section 210 in the cloud server 14 monitors the operating conditions of the client terminal 10. In a modification, the monitoring section 140 in the client terminal 10 may monitor the operating conditions of the client terminal 10, or the presence or absence of input from the input device 6 in this case. The monitoring section 140 may be a function of the player app, for example.

The monitoring section 140 measures a period during which the receiving section 110 does not receive any input from the input device 6 (non-operation period). After the monitoring section 140 determines that the receiving section 110 does not receive operation information from the input device 6 during the predetermined time, for example five minutes, the waiting state of the user is forcibly canceled. At this time, the wait canceling information transmitting block 126 may transmit wait canceling information indicating cancellation of the waiting state of the user to the cloud server 14. The request obtaining block 222 may obtain the wait canceling information as a wait canceling request. The assignment processing section 212 may cancel the waiting state of the user. Incidentally, after the monitoring section 140 determines that the non-operation period has reached five minutes, the client terminal 10 may be disconnected from the cloud server 14, and thereby the waiting state of the user may be forcibly canceled. When the waiting state is canceled, the notifying section 134 displays the notifying screen illustrated in FIG. 22 on the output device 4 to make a notification that the waiting state of the user is canceled.

This time-out processing is performed also after the start of the cloud game.

The monitoring section 140 monitors the input of the input device 6 during the processing of the cloud game by the processing unit 204. When the monitoring section 140 determines that no operation information has been input for a predetermined time (for example five minutes), the assignment processing section 212 cancels the assignment of the processing unit 204 to the user. After the monitoring section 140 determines that the non-operation period has reached five minutes, the transmitting section 120 may transmit an assignment canceling request to the cloud server 14. In response to this, the assignment processing section 212 may cancel the assignment of the processing unit 204 to the user. Incidentally, when the non-operation period has reached four minutes, the notifying section 134 may display the countdown timer illustrated in FIG. 23 on the output device 4.

During the execution of the cloud game, a function for displaying a plurality of menus is assigned to the home button 80. One of the menu items is "display of the home screen." By selecting this item, the user can display the home screen on the output device 4. Incidentally, in addition to the home screen illustrated in FIG. 6, a menu item for displaying a home screen generated by the cloud server 14 as a home screen may be prepared. Another menu item is "ending the game." By selecting this item, the user can end the cloud game. Incidentally, when the user saves the game at a time of the ending or during the game, the save data managing section 260 stores save data in the second storage system 19.

Description in the following will be made of handling of save data in the game system 1.

Figure 25:
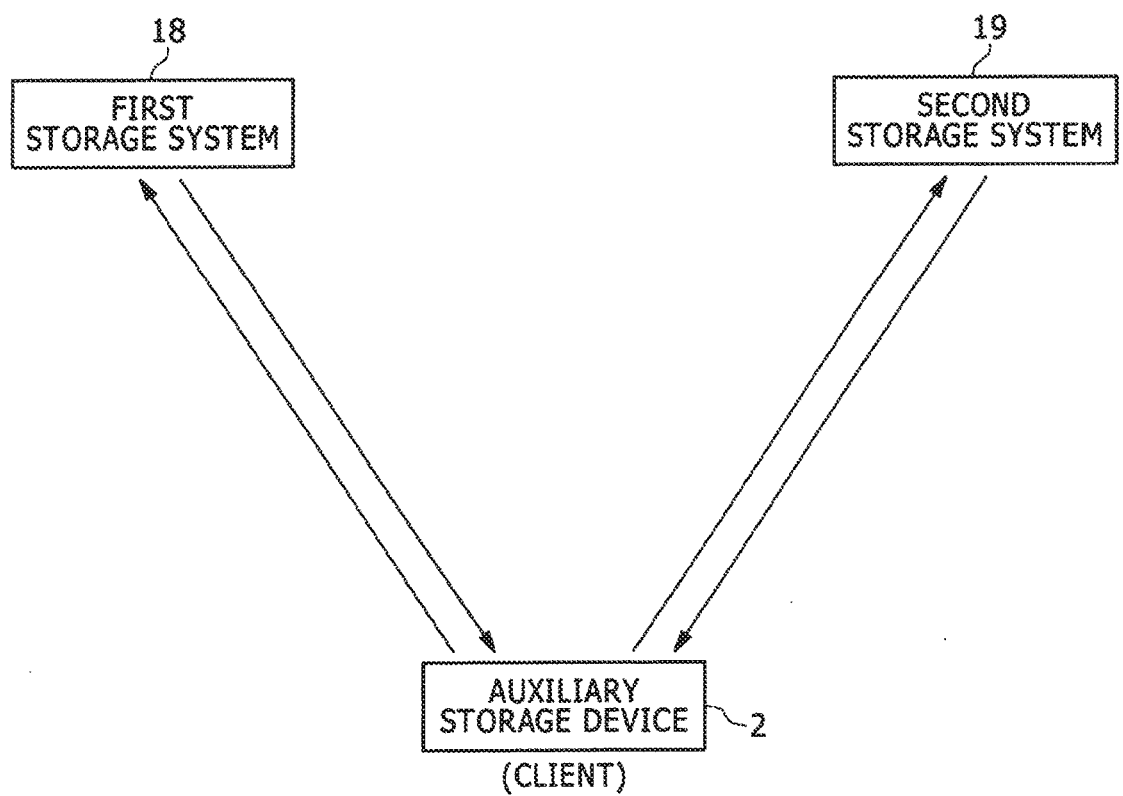
FIG. 25 is a diagram schematically illustrating relation between storages in the game system.

FIG. 25 schematically illustrates relation between the storages in the game system 1. In the game system 1, the client terminal 10 and the first storage system 18 are connected via the network 3, and the first storage system 18 transmits or receives save data to or from the client terminal 10. In addition, the client terminal 10 and the second storage system 19 are connected via the network 3, and the second storage system 19 transmits or receives save data to or from the client terminal 10. In the embodiment, the first storage system 18 and the second storage system 19 are not directly connected to each other.

The second storage system 19 stores save data generated in the cloud server 14. The cloud server 14 can use save data stored in the second storage system 19. In the game system 1, the second storage system 19 has a role of an auxiliary storage device for the cloud server 14. An application executed by the cloud server 14 has an upper limit to the storage capacity of save data. Thus, the storage capacity of save data assigned to the user in the second storage system 19 depends on the application, that is, is set within the upper limit for each application.

On the other hand, the first storage system 18 has a role of a backup storage for the client terminal 10. Hence, save data stored in the auxiliary storage device 2 is uploaded to the first storage system 18. The first storage system 18 thus has a role of a backup storage. The save data stored in the first storage system 18 is not directly accessed by an application executed by the client terminal 10 or the cloud server 14. Thus, the storage capacity assigned to the user in the first storage system 18 does not depend on the application. Hence, the user can freely upload save data to the first storage system 18. As required, the client terminal 10 can download the save data from the first storage system 18, and use the save data for the processing of the application.

The cloud game executed by the cloud server 14 accesses save data stored in the second storage system 19. Thus, basically, as long as the user is executing the cloud game, the save data stored in the second storage system 19 does not need to be downloaded to the auxiliary storage device 2. However, in a case where the user plays the cloud game, and thereafter the user downloads a game having the same title from the store server 12 and executes the game on the client terminal 10, the save data stored in the second storage system 19 is desired to be used. It is therefore desirable to construct a mechanism that enables save data stored in the second storage system 19 to be downloaded to the auxiliary storage device 2. Conversely, a case is also assumed in which after the user downloads a game application from the store server 12 to the auxiliary storage device 2 and executes the game application on the client terminal 10, the user makes a game having the same title executed by the cloud server 14. When the cloud game is played, a portable client terminal such for example as a smart phone or the like can be used, so that the user can freely enjoy the game even outdoors. In that case, a mechanism is desirably constructed in which save data stored in the auxiliary storage device 2 is uploaded to the second storage system 19 so that the cloud game can use the save data of the local game. In addition, when the user returns home, and executes the game application on the client terminal 10, it is desirable to be able to use, also on the client terminal 10, the save data stored in the second storage system 19 in the cloud game.

Accordingly, in the game system 1, the save data managing section 150 of the client terminal 10 and the save data managing section 260 of the cloud server 14 can cooperate with each other to share save data. For example, when the user has license information for a game in the client terminal 10, and the user has license information for the same game in the cloud server 14, the save data managing section 150 can obtain save data stored in the second storage system 19 and store the save data in the auxiliary storage device 2, and the save data managing section 260 controls the second storage system 19 so that the second storage system 19 obtains save data stored in the auxiliary storage device 2 and stores the save data. The cloud server 14 can thereby process the cloud game using the save data obtained from the auxiliary storage device 2 and stored in the second storage system 19. The save data managing section 150 and the save data managing section 260 may operate so as to synchronize the save data of the game. That is, the second storage system 19 may have a function of synchronizing save data between the second storage system 19 and the auxiliary storage device 2, and the auxiliary storage device 2 may have a function of synchronizing save data between the auxiliary storage device 2 and the second storage system 19. Consequently, when the user plays the game, the user can use latest save data regardless of whether the user plays the game locally (that is, whether the client terminal 10 executes the game) or whether the user plays the game in the cloud (that is, whether the cloud server 14 executes the game).

Incidentally, the save data managing section 150 and the save data managing section 260 may not automatically synchronize save data. However, when the user performs local play, for example, a message indicating that save data can be downloaded from the second storage system 19 may be notified, and when the user performs cloud play, a message indicating that save data can be uploaded from the auxiliary storage device 2 to the second storage system 19 may be notified. For example, when the user performs local play or cloud play, the save data managing section 150 inquires of the save data managing section 260 about date and time information of save data. In the case of local play, the save data managing section 150 may check whether or not new save data not retained in the auxiliary storage device 2 is present in the second storage system 19. In the case of cloud play, on the other hand, the save data managing section 150 checks whether or not new save data not retained in the second storage system 19 is present in the auxiliary storage device 2. When there is new save data, a message as described above may be notified. This facilitates the user using the new save data at a time of game play.

The save data managing section 150 manages save data as follows.

In the following, a second directory represents a subdirectory of a first directory, and a third directory represents a subdirectory of the second directory.

<First Directory>
save data management
<Second Directory>
first storage system
second storage system
memory card
save data in the auxiliary storage device 2
<Third Directory>
save data in the first storage system 18
save data in the second storage system 19
save data in the memory card The following description will be made of a procedure for manually uploading save data in the auxiliary storage device 2 which save data is stored in the second directory.

Figure 26:
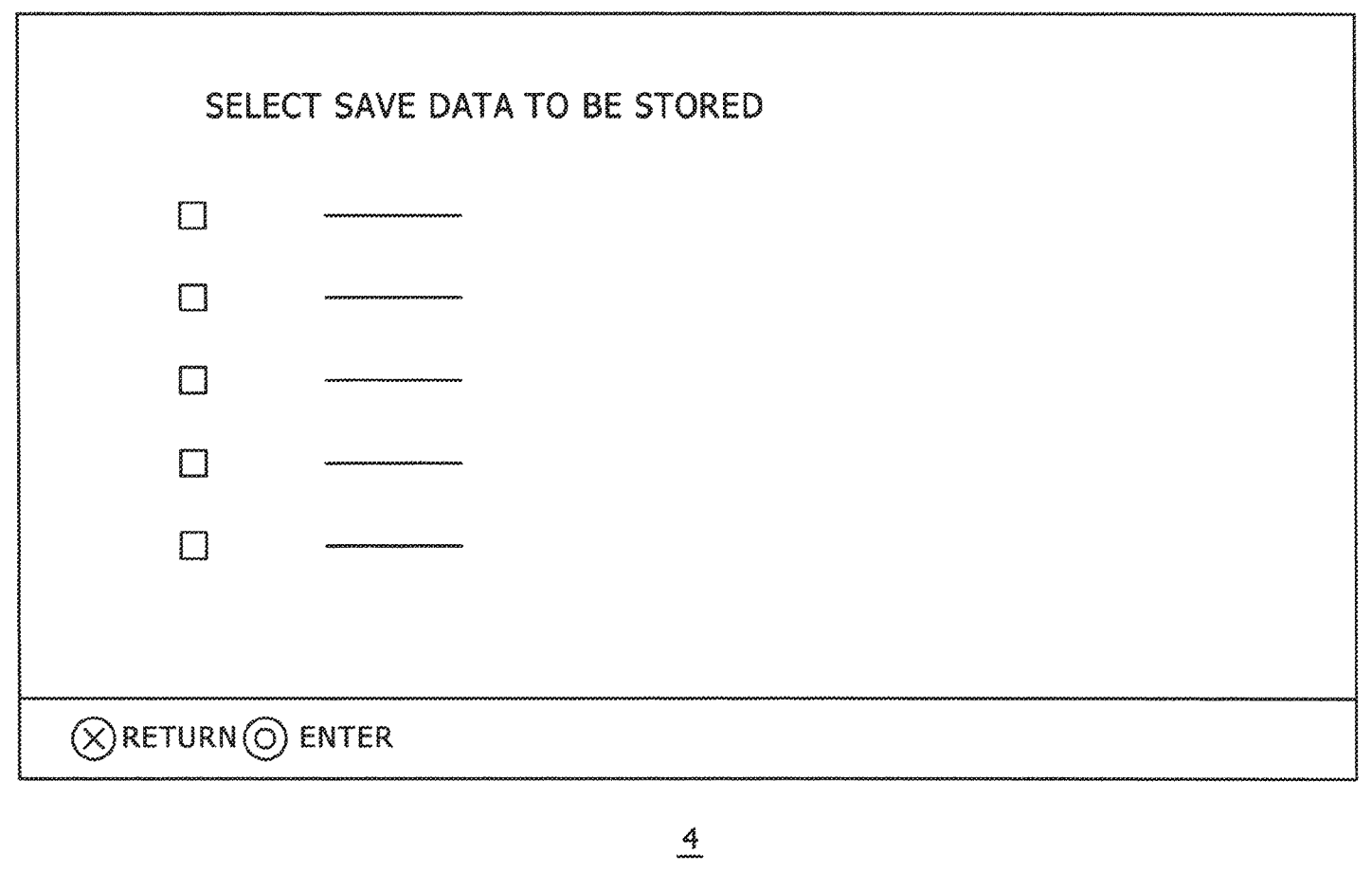

FIG. 26 illustrates a save data selecting screen when the user uploads save data of the auxiliary storage device 2. The user selects save data to be uploaded on this selecting screen.

FIG. 27 illustrates an upload destination selecting screen. The user can select one of the storages as a save data storage destination, and upload the selected save data to the save data storage destination.

When the user uploads save data to the first storage system 18, the user can perform backup storage of the save data. In addition, when the user uploads save data to the second storage system 19, the cloud server 14 can use the save data. When the user thus properly uses the first storage system 18 and the second storage system 19 as upload destinations as appropriate, appropriate management of save data is realized.

The present invention has been described above on the basis of embodiments. The embodiments are illustrative, and it is to be understood by those skilled in the art that combinations of constituent elements and processing processes of the embodiments are susceptible of various modifications, and that such modifications also fall within the scope of the present invention. In the embodiments, the game system 1 that processes game applications as one mode of the information processing system according to the present invention has been taken as an example. However, the information processing system may have a function of processing applications other than games.

In the embodiments, description has been made of a case where a screen such as the home screen or the like is generated by the system software of the client terminal 10. However, a screen such as the home screen or the like may be generated by the cloud server 14 and output from the output device 4.

In the game system 1, when the client terminal 10 is a game dedicated machine of a newest generation, the cloud server 14 may provide a game of a previous generation to the client terminal 10. In such a case, the client terminal 10 can execute a game having the same title as in the cloud server 14 by using an emulator that generates an environment of a game dedicated machine of the previous generation. When the client terminal 10 retains save data of the game of the previous generation, and uploads the save data to the second storage system 19, the user can play the cloud game using the save data in the cloud server 14. Incidentally, the user can enjoy the game even when the user is not at home, by being provided with the cloud service by the cloud server 14. Thus, synchronizing save data between the auxiliary storage device 2 and the second storage system 19 has a great advantage.

Incidentally, the present embodiments assume that the first storage system 18 and the second storage system 19 are not directly connected to each other via the network 3. However, the first storage system 18 and the second storage system 19 may be connected to each other via the network 3. Incidentally, in this case, save data may be synchronized between the first storage system 18 and the second storage system 19. For example, the synchronization of save data may be performed periodically, performed when the save data is updated, or performed according to an instruction from the user.

REFERENCE SIGNS LIST

1 . . . Game system, 2 . . . Auxiliary storage device, 3 . . . Network, 4 . . . Output device, 5 . . . Server system, 6 . . . Input device, 10 . . . Client terminal, 12 . . . Store server, 14 . . . Cloud server, 16 . . . Database, 18 . . . First storage system, 19 . . . Second storage system, 100 . . . Processing unit, 102 . . . Communicating unit, 110 . . . Receiving section, 120 . . . Transmitting section, 122 . . . Request transmitting block, 124 . . . Operation information transmitting block, 126 . . . Wait canceling information transmitting block, 130 . . . Obtaining section, 132 . . . Icon display section, 134 . . . Notifying section, 136 . . . Application executing section, 138 . . . Output processing section, 140 . . . Monitoring section, 150 . . . Save data managing section, 200 . . . Managing unit, 202 . . . Communicating unit, 204 . . . Processing unit, 210 . . . Operation monitoring section, 212 . . . Assignment processing section, 220 . . . Obtaining section, 222 . . . Request obtaining block, 224 . . . Operation information obtaining block, 230 . . . Operation information providing section, 240 . . . Transmitting section, 242 . . . Processing result transmitting block, 244 . . . Wait information transmitting block, 246 . . . Processing possible information transmitting block, 248 . . . Time-out information transmitting block, 250 . . . Metadata transmitting block, 260 . . . Save data managing section.

INDUSTRIAL APPLICABILITY

The present invention is applicable to a technical field in which applications are processed.

The invention claimed is:

1. An information processing device comprising:
a receiving circuit operating to receive a request to execute an application;
an obtaining circuit operating to obtain information on a wait for processing of the application from a server system when there is no assignable processing unit in the server system; and
a notifying circuit operating to make a notification that the processing of the application is to be started when the obtaining circuit obtains information indicating that the processing of the application can be started from the server system in a state of waiting for a start of the processing of the application in the server system,
wherein the notification information to the user of the information processing device includes an opportunity for the user to consent to waiting,
wherein when another application is processed in the state of waiting for the start of the processing of the application in the server system, the notifying circuit makes a notification that the other application is to be suspended, and
wherein the notification information to the user of the information processing device includes an estimate of an amount of time to wait before execution may begin.

2. An information processing system comprising:
a client terminal; and
a server system having a plurality of processing units processing applications;
the client terminal and the server system being connected to each other via a network;
the server system including
a first obtaining circuit operating to obtain a request to execute an application,
an assignment processing circuit operating to make the client terminal wait for a start of processing of the application when there is no processing unit assignable to the client terminal, and
a transmitting circuit operating to transmit information indicating that the processing of the application can be started to the client terminal when at least one processing unit becomes assignable;
the client terminal including
a second obtaining circuit operating to obtain the information indicating that the processing of the application can be started from the server system, and
a notifying circuit operating to make a notification that the processing of the application is to be started in the server system,
wherein the notification information to the user of the information processing device includes an opportunity for the user to consent to waiting,
wherein when another application is processed in the state of waiting for the start of the processing of the application in the server system, the notifying circuit makes a notification that the other application is to be suspended, and
wherein the notification information to the user of the information processing device includes an estimate of an amount of time to wait before execution may begin.

3. The information processing system according to claim 2, wherein when a change is made from a state in which there is no processing unit assignable to the client terminal to a state in which at least one processing unit becomes assignable, the assignment processing circuit makes the processing unit start the processing of the application identified by the execution request received by the first obtaining circuit.

4. The information processing device of claim 1, wherein the notification information to the user of the information processing device includes that the user's request is in in a wait state.

5. The information processing device of claim 1, wherein the notification information to the user of the information processing device includes a countdown when the amount of time remaining to wait is relatively short.

6. The information processing device of claim 1, wherein the notification includes notification information to a user of the information processing device, including a number of other users waiting ahead of the user.

7. A non-transitory, computer readable recording medium on which a program is recorded, the program when executed by a computer causes the computer to carry out actions of an information processing device, comprising:
by a receiving section, receiving a request to execute an application;
by an obtaining section, obtaining information on a wait for processing of the application from a server system when there is no assignable processing unit in the server system;
by another obtaining section, obtaining information indicating that the processing of the application can be started from the server system in a state of waiting for a start of the processing of the application in the server system; and
by a notifying section, making a notification that the processing of the application in the server system is to be started, wherein the notification information to the user of the information processing device includes an opportunity for the user to consent to waiting,
wherein when another application is processed in the state of waiting for the start of the processing of the application in the server system, the notifying section makes a notification that the other application is to be suspended, and
wherein the notification information to the user of the information processing device includes an estimate of an amount of time to wait before execution may begin.

* * * * *